US009195235B2

(12) United States Patent
Troy et al.

(10) Patent No.: US 9,195,235 B2
(45) Date of Patent: Nov. 24, 2015

(54) BEAM DIRECTED MOTION CONTROL SYSTEM

(71) Applicant: The Boeing Company, Chicago, IL (US)

(72) Inventors: James J. Troy, Issaquah, WA (US); Scott Wesley Lea, Renton, WA (US); Gary Ernest Georgeson, Tacoma, WA (US); Karl Edward Nelson, Shoreline, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 14/467,049

(22) Filed: Aug. 25, 2014

(65) Prior Publication Data

US 2014/0365063 A1 Dec. 11, 2014

Related U.S. Application Data

(62) Division of application No. 13/206,269, filed on Aug. 9, 2011, now Pat. No. 8,874,371.

(51) Int. Cl.
*G05D 1/02* (2006.01)

(52) U.S. Cl.
CPC ............ *G05D 1/0231* (2013.01); *G05D 1/0212* (2013.01); *G05D 1/0246* (2013.01); *G05D 1/0276* (2013.01); *G05D 2201/0207* (2013.01); *Y10S 901/01* (2013.01); *Y10S 901/47* (2013.01)

(58) Field of Classification Search
USPC .......................................................... 701/23
See application file for complete search history.

(56) References Cited

U.S. PATENT DOCUMENTS

| | | | |
|---|---|---|---|
| 5,443,354 A | 8/1995 | Stone et al. |
| 5,487,440 A | 1/1996 | Seemann |
| 5,551,525 A | 9/1996 | Pack et al. |
| 6,378,387 B1 | 4/2002 | Froom |
| 6,637,266 B1 | 10/2003 | Froom |
| 7,147,535 B2 | 12/2006 | Simeray |
| 7,643,893 B2 | 1/2010 | Troy et al. |
| 7,859,655 B2 | 12/2010 | Troy et al. |
| 7,934,575 B2 | 5/2011 | Waibel et al. |
| 8,319,951 B1 | 11/2012 | Troy |
| 8,447,805 B2 | 5/2013 | Troy et al. |

(Continued)

FOREIGN PATENT DOCUMENTS

| | | |
|---|---|---|
| GB | 2369511 A | 5/2002 |
| WO | WO2009038797 A2 | 3/2009 |

OTHER PUBLICATIONS

International Preliminary Report on Patentability, dated Feb. 11, 2014, regarding Application No. PCT/US2012/042761, 6 pages.

(Continued)

*Primary Examiner* — Shelley Chen
(74) *Attorney, Agent, or Firm* — Yee & Associates, P.C.

(57) ABSTRACT

A method and apparatus comprising an energy source, a position system, and a movement system. The energy source is configured to generate a beam of energy directed at an area on a target for a vehicle. The position system is configured to identify a first position of the area on the target at which the beam of energy is directed. The movement system is configured to move the vehicle in a manner that reduces a difference between the first position of the area on the target at which the beam of energy is directed and a reference position on the target.

15 Claims, 20 Drawing Sheets

(56) References Cited

U.S. PATENT DOCUMENTS

| | | |
|---|---|---|
| 8,632,376 B2 | 1/2014 | Dooley et al. |
| 8,713,998 B2 | 5/2014 | Troy et al. |
| 2003/0228916 A1 | 12/2003 | Simeray |
| 2006/0055396 A1 | 3/2006 | Georgeson et al. |
| 2006/0055399 A1 | 3/2006 | Georgeson et al. |
| 2007/0173171 A1 | 7/2007 | Pal Benedek et al. |
| 2008/0063400 A1 | 3/2008 | Hudson et al. |
| 2008/0077276 A1 | 3/2008 | Montero Sanjuan et al. |
| 2009/0081923 A1 | 3/2009 | Dooley et al. |
| 2009/0086014 A1 | 4/2009 | Lea et al. |
| 2009/0166102 A1 | 7/2009 | Waibel et al. |
| 2010/0085437 A1 | 4/2010 | Troy et al. |
| 2012/0221625 A1 | 8/2012 | Troy et al. |
| 2012/0320372 A1 | 12/2012 | Troy et al. |
| 2013/0041544 A1 | 2/2013 | Troy et al. |

OTHER PUBLICATIONS

"Motion Capture Systems from Vicon", 1 page, obtained from http://www.vicon.com/.

"Xsens: 3D Motion Tracking—Xsens", 1 page, obtained from http://www.xsens.com/.

"InterSense Incorporated/precision Motion Tracking Solutions/Horne", 2 pages, obtained from http://www.intersense.com/.

PCT SR dated Aug. 29, 2012 regarding application PCT/US2012/042761, applicant The Boeing Company, 12 pages.

Song et al., "Zig Bee Based Wireless Sensor Network for Service Robot Intelligent Space," 2011 Conference on Information Science and Technology, Mar. 2011, 6 pages.

Office Action, dated Dec. 13, 2013, regarding U.S. Appl. No. 13/206,269, 17 pages.

Final Office Action, dated Mar. 10, 2014, regarding U.S. Appl. No. 13/206,269, 17 pages.

Notice of Allowance, dated Jun. 20, 2014, regarding U.S. Appl. No. 13/206,269, 12 pages.

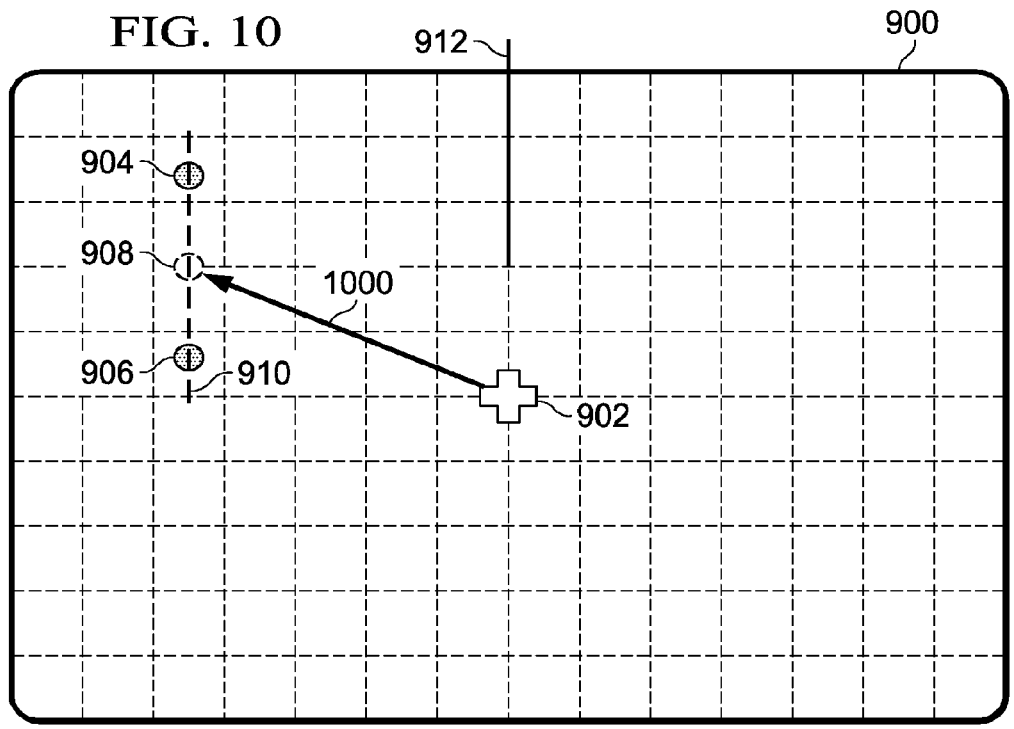
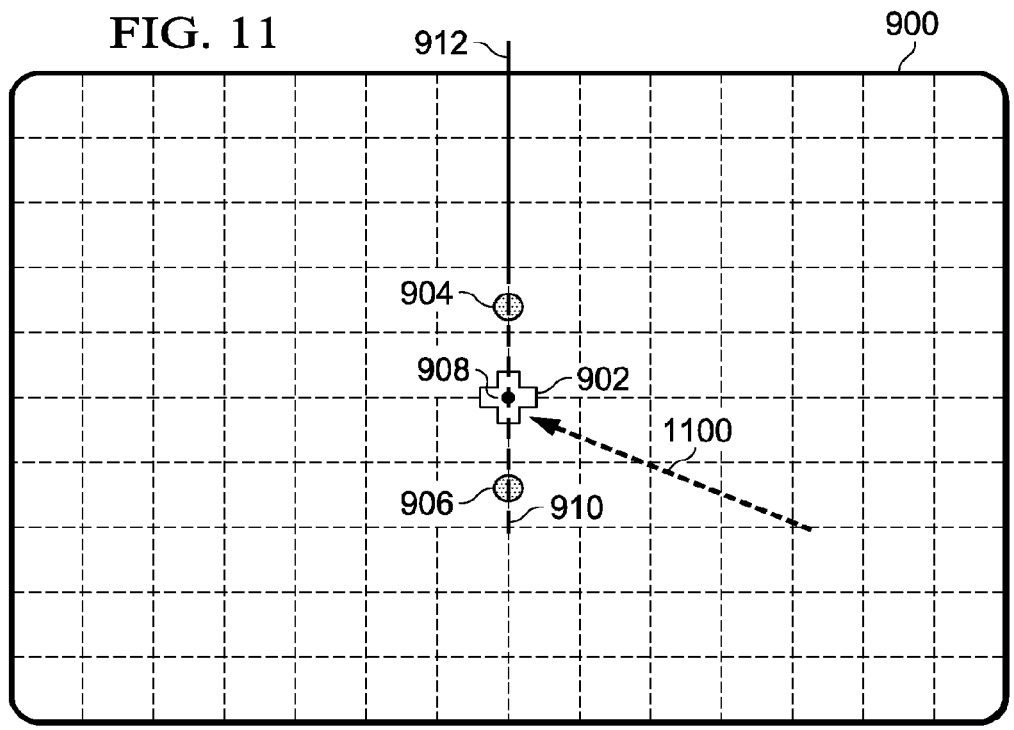

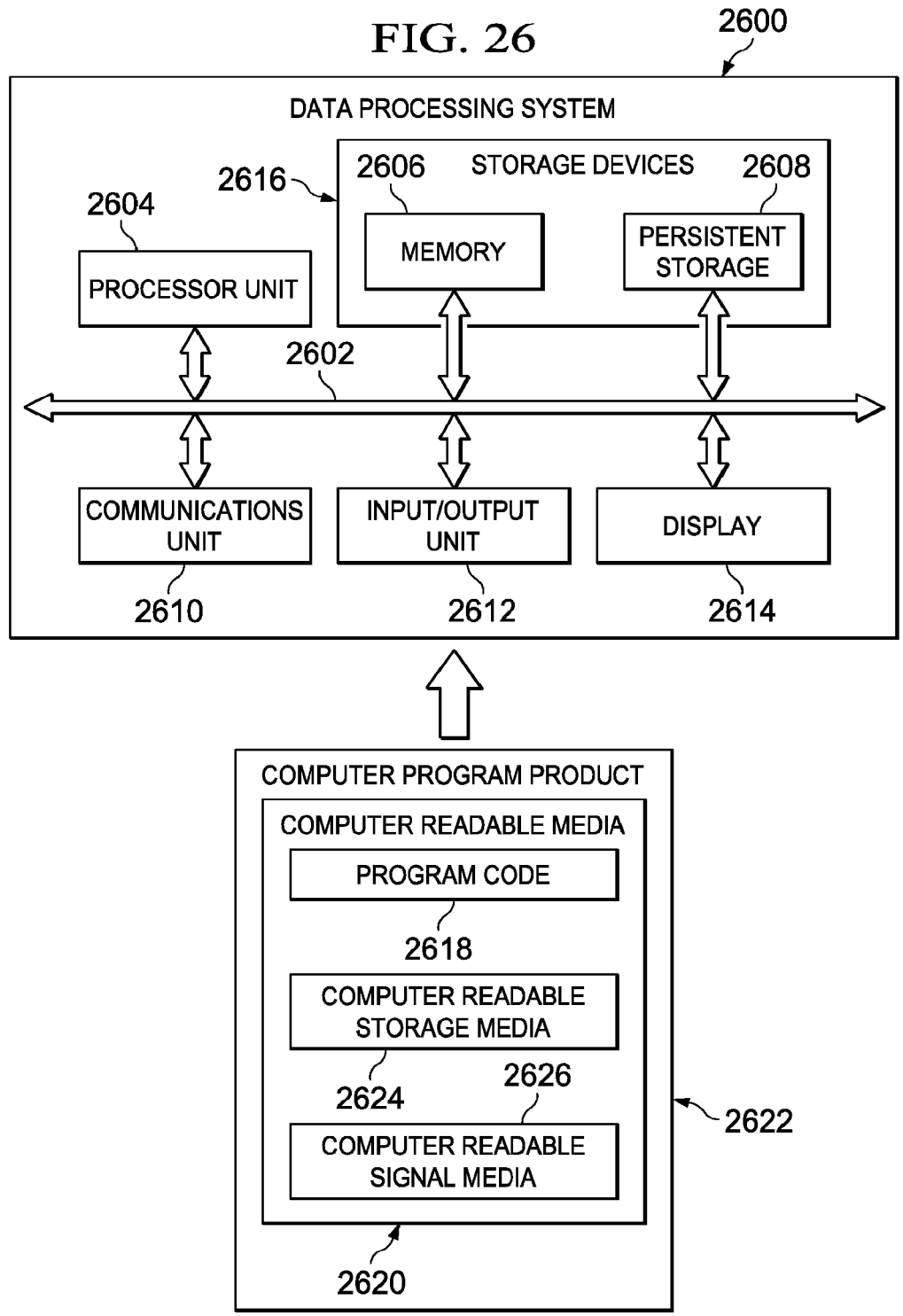

BEAM DIRECTED MOTION CONTROL SYSTEM

This application is a divisional application of U.S. application Ser. No. 13/206,269, filed Aug. 9, 2011.

BACKGROUND INFORMATION

1. Field

The present disclosure relates generally to vehicles and, in particular, to controlling movement of vehicles. Still more particularly, the present disclosure relates to a method and apparatus for directing the movement of vehicles using an energy beam, such as a beam of light.

2. Background

Vehicles are used for many different purposes. For example, vehicles are used to move cargo, equipment, people, and other items. Further, vehicles are also used in non-destructive evaluation (NDE) testing. For example, a vehicle may be used in performing non-destructive evaluation testing of an object, such as an aircraft. Non-destructive evaluation testing of an aircraft may include performing any number of inspections selected from, for example, without limitation, eddy current testing, ultrasonic testing, image analysis, and/or other suitable types of testing.

Typically, the vehicles used in non-destructive evaluation testing of aircraft have a size that allows the vehicles to move on the surface of the aircraft. These vehicles may be configured to carry testing equipment for performing different types of non-destructive evaluation inspections. For example, these vehicles may take the form of robotic crawlers. Robotic crawlers may move using wheels, continuous tracks, legs, and/or other suitable types of movement mechanisms.

With this type of non-destructive evaluation testing, the robotic crawlers may be controlled to move over different areas of the aircraft to perform the desired testing for those areas. The robotic crawlers and/or other vehicles used to perform the inspections may use control systems that have a capability to provide the desired movement for these vehicles. Oftentimes, these control systems are located on-board the vehicles. On-board control systems may include sensors, such as, for example, cameras, navigation sensors, and/or other suitable types of sensors on-board the vehicles. These on-board sensors may increase the weight and cost of the vehicles more than desired.

Therefore, it would advantageous to have a method and apparatus that takes into account at least some of the issues discussed above as well as possibly other issues.

SUMMARY

In one illustrative embodiment, an apparatus comprises an energy source, a position system, and a movement system. The energy source is configured to generate a beam of energy directed at an area on a target for a vehicle. The position system is configured to identify a first position of the area on the target at which the beam of energy is directed. The movement system is configured to move the vehicle in a manner that reduces a difference between the first position of the area on the target at which the beam of energy is directed and a reference position on the target.

In another illustrative embodiment, a vehicle control system comprises a light source, a position system, a controller, and a movement system. The light source is configured to generate a beam of light that illuminates an area on a target connected to a vehicle. The position system is configured to identify a first position of the area illuminated by the beam of light on the target. The controller is configured to move the beam of light with respect to the target such that the first position of the area illuminated by the beam of light moves on the target with respect to a reference position. The movement system is configured to move the vehicle in a manner that reduces a difference between the first position of the area illuminated by the beam of light and a reference position on the target.

In yet another illustrative embodiment, a method for moving a vehicle is provided. A beam of energy is directed towards an area on a target. A first position of the area on the target is identified. The vehicle is moved in a manner that reduces a difference between the first position and a reference position on the target.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

FIG. 10 is an illustration of a target with different positions for areas on the target illuminated by laser beams relative to a reference position on the target in accordance with an illustrative embodiment;

FIG. 11 is an illustration of a target with different positions for areas on the target illuminated by laser beams relative to a reference position on the target in accordance with an illustrative embodiment;

FIG. 26 is an illustration of a data processing system in accordance with an illustrative embodiment.

DETAILED DESCRIPTION

Figure 1:
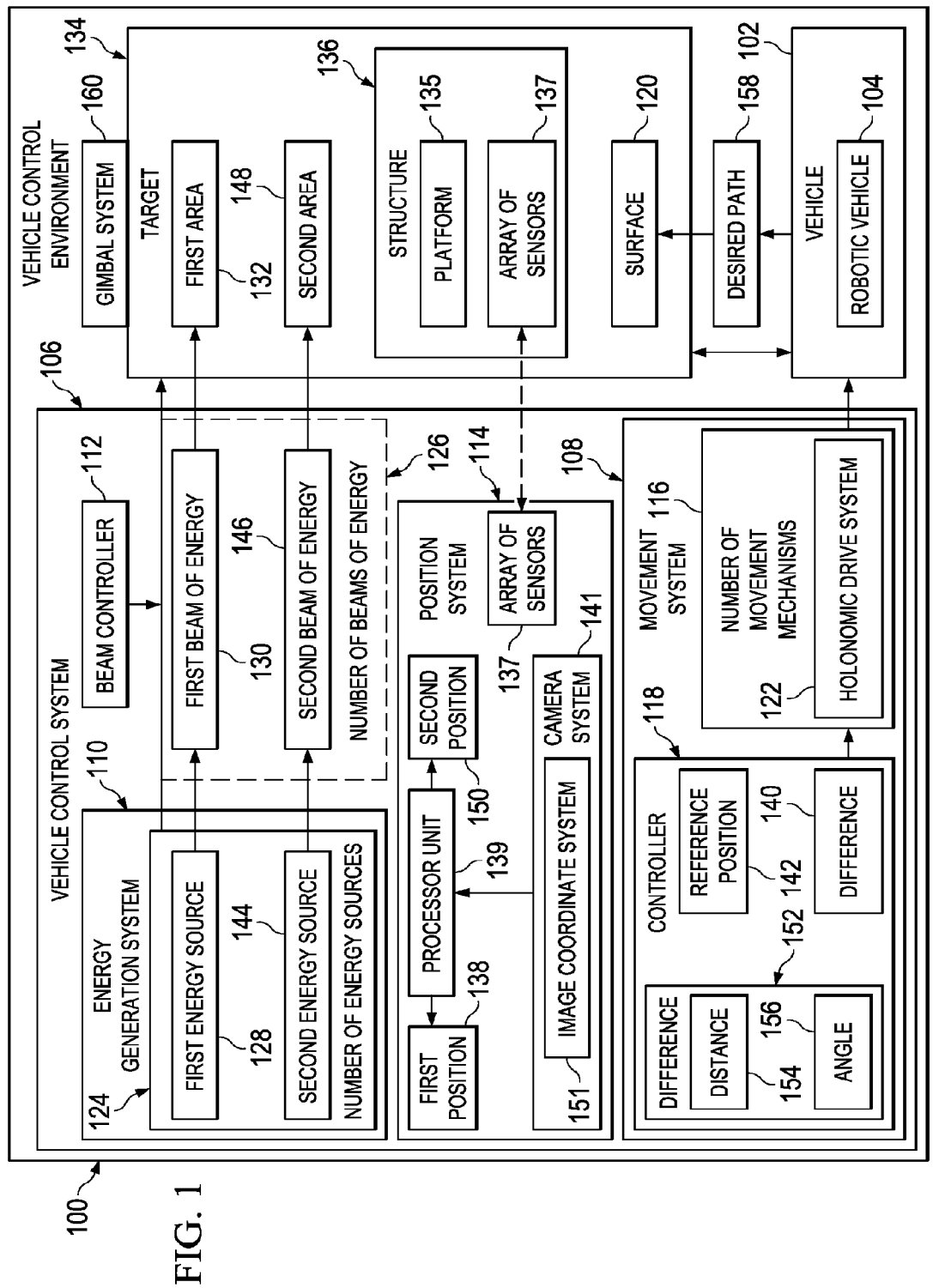
FIG. 1 is an illustration of a block diagram of a vehicle control environment in accordance with an illustrative embodiment.

The different illustrative embodiments recognize and take into account one or more different considerations. For example, the different illustrative embodiments recognize and take into account that in addition to increasing the weight and cost of vehicles, using on-board sensors may also require more processing power than desired.

The different illustrative embodiments also recognize and take into account that typically, sensors on-board a vehicle may control the movement of the vehicle without using an external position reference system. The different illustrative embodiments also recognize and take into account that without the use of an external position reference system, the control provided by these on-board sensors may not be as precise as desired.

Additionally, when moving a vehicle on the surface of an aircraft to perform non-destructive evaluation testing, the accuracy desired in moving a vehicle to different areas on the aircraft may be greater than the accuracy desired with other types of vehicles used in other situations. For example, the different illustrative embodiments recognize and take into account that particular areas on the aircraft may be identified as having the potential to form inconsistencies. Further, inconsistencies may be detected at other areas on the aircraft.

The different illustrative embodiments recognize and take into account that accuracy in moving a vehicle that carries equipment for non-destructive evaluation testing to these areas on the aircraft is important. In particular, moving the vehicle to these areas with accuracy is important to obtain information for use in determining whether these areas require further testing, rework of parts at these areas, and/or other operations to be performed.

The different illustrative embodiments also recognize and take into account that one solution is to use a motion capture system that tracks the location of the vehicle as the vehicle moves on the aircraft. However, the number of cameras and other equipment needed for a motion capture system may increase cost and complexity more than desired. Further, moving the motion capture system to different locations for testing different aircraft may require more time and/or effort than desired. Still further, the different illustrative embodiments recognize and take into account that the time and/or effort required for setting up and calibrating the multiple cameras used in a motion capture system may be greater than desired.

The illustrative embodiments also recognize and take into account that using a global positioning system (GPS) unit on the vehicle to track movement of the vehicle may not be as reliable as desired when performing testing indoors. Further, tracking movement of the vehicle using a global positioning system (GPS) unit may not provide the desired level of accuracy for performing non-destructive evaluation testing.

Thus, the illustrative embodiments provide a method and apparatus for controlling the movement of the vehicle. In one illustrative embodiment, an apparatus comprises an energy source, a position system, and a movement system. The energy source is configured to generate a beam of energy directed at an area on a target for a vehicle. The position system is configured to identify a first position of the area on the target at which the beam of energy is directed. The movement system is configured to move the vehicle in a manner that reduces a difference between the first position of the area on the target at which the beam of energy is directed and a reference position on the target.

Further, the beam of energy may be moved to move the first position of the area on the target at which the beam is directed with respect to the reference position. By changing the first position of the area relative to the reference position, the vehicle may be moved along a desired path.

With reference now to the figures, and in particular to FIG. 1, an illustration of a block diagram of a vehicle control environment is depicted in accordance with an illustrative embodiment. In this illustrative example, vehicle control environment 100 is an environment in which the different illustrative embodiments may be implemented to control the movement of vehicle 102.

As depicted, vehicle 102 may take the form of robotic vehicle 104. Robotic vehicle 104 may be any type of electro-mechanical machine configured to move in response to computer and/or electronic programming. In these depicted examples, robotic vehicle 104 may be used in performing a number of different operations. As used herein, a "number of items", means one or more items. For example, a "number of different operations" means one or more different operations.

In one illustrative example, robotic vehicle 104 may be used in performing non-destructive evaluation (NDE) testing of an object, such as an aircraft. For example, robotic vehicle 104 may carry equipment for performing various types of non-destructive evaluation tests and may move along the surface of the aircraft to locations selected for testing.

In these illustrative examples, vehicle control system 106 is configured to control the movement of vehicle 102 within vehicle control environment 100. As depicted, vehicle control system 106 comprises movement system 108, energy generation system 110, beam controller 112, and position system 114. Movement system 108 is configured to move vehicle 102 in these illustrative examples.

As illustrated, movement system 108 includes number of movement mechanisms 116 and controller 118. Number of movement mechanisms 116 is configured to move vehicle 102 on surface 120 in vehicle control environment 100. Surface 120 may be, for example, a ground, a surface of an object, a surface of a building, or some other suitable type of surface.

Number of movement mechanisms 116 may include any number of wheels, rollers, casters, sliders, tracks, actuators, and/or other types of movement devices. In some illustrative examples, number of movement mechanisms 116 may include holonomic drive system 122. Holonomic drive system 122 is a system configured to move vehicle 102 in substantially all directions without any constraints.

In particular, holonomic drive system 122 allows vehicle 102 to translate in substantially all directions and rotate independently of this translation without any constraints. When vehicle 102 translates, vehicle 102 moves in a substantially same direction with respect to an axis. In other words, when translating, vehicle 102 moves substantially parallel to an axis without rotating. When vehicle 102 rotates, vehicle 102 moves around an axis through vehicle 102.

Holonomic drive system 122 may include, for example, wheels and/or other devices that may be attached to vehicle 102 to provide vehicle 102 with the capability of holonomic motion. These types of wheels are also referred to as omnidirectional wheels.

As one illustrative example, holonomic drive system 122 may be implemented using Mecanum wheels. A Mecanum wheel is a wheel that is configured to move in any direction. This type of wheel may also be referred to as an Ilon wheel. The wheel may be a wheel with a series of rollers attached to the circumference of the wheel. The rollers may have an axis of rotation that is about 45 degrees to the plane of the wheel in a plane that is parallel to an axis of rotation for the wheel.

In these depicted examples, controller 118 in movement system 108 is configured to control the operation of number of movement mechanisms 116. In this manner, controller 118 controls the movement of vehicle 102. In one illustrative example, controller 118 may be located on-board vehicle 102 and configured to send commands to number of movement mechanisms 116 to control the movement of vehicle 102. In another illustrative example, controller 118 may be located remotely to vehicle 102 and configured to send commands to number of movement mechanisms 116 wirelessly.

Controller 118 controls the movement of vehicle 102 using energy generation system 110, beam controller 112, and position system 114. Energy generation system 110 comprises number of energy sources 124 in these illustrative examples. Number of energy sources 124 is located remotely to vehicle 102 in these examples. Further, number of energy sources 124 is configured to generate number of beams of energy 126.

In these illustrative examples, a beam of energy in number of beams of energy 126 may take the form of a beam of electromagnetic radiation. For example, the beam of energy may be selected from one of a beam of visible light, a laser beam, a beam of ultraviolet light, a beam of infrared light, a beam of microwave radiation, an electron gun, or some other suitable type of beam of energy. Further, in these illustrative examples, a beam of energy in number of beams of energy 126 may be a substantially collimated beam of energy.

In other illustrative examples, the beam of energy may be made of a stream of particles, such as a stream of water, air, and/or other fluids. With this type of system, the beam transmits kinetic energy.

Beam controller 112 in vehicle control system 106 is configured to control the generation of number of beams of energy 126 by energy generation system 110. In particular, beam controller 112 controls the number of directions in which number of beams of energy 126 is directed.

In one illustrative example, number of energy sources 124 includes first energy source 128. First energy source 128 is configured to generate first beam of energy 130. In this illustrative example, first energy source 128 may be a light source and first beam of energy 130 may be a beam of light. In particular, first beam of energy 130 is a laser beam in this example. Beam controller 112 is configured to cause first beam of energy 130 to be directed at first area 132 on target 134 for vehicle 102. In particular, first beam of energy 130 in the form of a beam of light illuminates first area 132 on target 134.

In these illustrative examples, first area 132 is the portion of target 134 at which first beam of energy 130 intersects target 134. First area 132 may be a two-dimensional area having a shape in the form of, for example, a rectangle, a circle, an ellipse, or some other suitable shape.

In some illustrative examples, target 134 for vehicle 102 is surface 120 on which vehicle 102 moves. In other illustrative examples, target 134 for vehicle 102 is structure 136 associated with vehicle 102. The association between structure 136 and vehicle 102 is a physical association in these depicted examples.

A first component, such as structure 136, may be considered to be associated with a second component, such as vehicle 102, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of, and/or an extension of, the second component.

Structure 136 may comprise at least one of a piece of frosted glass, an array of sensors, an array of photosensitive elements, an array of photodiodes, an array of phototransistors, a platform, a substantially planar structure, a diffusion filter, an opaque surface, and some other suitable type of structure at which number of beams of energy 126 may be directed.

As used herein, the phrase "at least one of", when used with a list of items, means different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In one illustrative example, structure 136 may comprise platform 135 and array of sensors 137. When number of beams of energy 126 is a number of beams of light, array of sensors 137 may take the form of an array of light sensors. In other illustrative examples, when number of beams of energy 126 is a number of streams of particles, array of sensors 137 may take the form of an array of pressure sensors.

In these illustrative examples, platform 135 is a substantially planar platform configured to hold array of sensors 137.

When structure 136 includes array of sensors 137, array of sensors 137 may be part of position system 114 in vehicle control system 106.

Position system 114 is configured to identify first position 138 of first area 132 on target 134 at which first beam of energy 130 is directed. In identifying first position 138, position system 114 uses information from array of sensors 137 to determine where first area 132 is located on target 134. As used herein, a position of an area, such as first position 138 of first area 132, may be the centroid of center position of the area.

For example, position system 114 may also include processor unit 139 that is configured to identify first area 132 in response to information from array of sensors 137 indicating that a number of sensors in array of sensors 137 at first area 132 detects first beam of energy 130. As one illustrative example, first beam of energy 130 may be detected in the form of a beam of light. Processor unit 139 then identifies first position 138 of first area 132. In one illustrative example, processor unit 139 may identify first position 138 of first area 132 by computing the centroid of first area 132 on target 134.

As another illustrative example, position system 114 may include camera system 141 instead of array of sensors 137. For example, structure 136 may be a diffusion filter instead of platform 135 holding array of sensors 137. Camera system 141 may be associated with vehicle 102 in some illustrative examples. Camera system 141 may be configured to generate images of target 134 that include first area 132 being illuminated by first beam of energy 130 in the form of a beam of light. Processor unit 139 may use these images to identify first position 138 of first area 132 on target 134.

Position system 114 sends first position 138 to controller 118 in movement system 108. Controller 118 uses first position 138 to move vehicle 102 in a manner that reduces difference 140 between first position 138 of first area 132 on target 134 and reference position 142 on target 134. Reference position 142 may be a pre-defined position on target 134. Reference position 142 on target 134 may move as vehicle 102 moves.

In these illustrative examples, difference 140 between first position 138 and reference position 142 is a distance between these two positions. Controller 118 moves vehicle 102 to reduce this distance. For example, when target 134 is structure 136 associated with vehicle 102, controller 118 moves vehicle 102 such that first position 138 of first area 132 on target 134 at which first beam of energy 130 is directed changes. In particular, controller 118 moves vehicle 102 in a direction on surface 120 that reduces the distance between first position 138 and reference position 142.

In one illustrative example, number of energy sources 124 also includes second energy source 144. Second energy source 144 is configured to generate second beam of energy 146. In this illustrative example, second beam of energy 146 is a beam of light and, in particular, a laser beam. In some illustrative examples, the color of second beam of energy 146 in the form of a beam of light may be selected as different from the color of first beam of energy 130 in the form of a beam of light.

Beam controller 112 directs second beam of energy 146 at second area 148 on target 134. Further, beam controller 112 may direct second beam of energy 146 at second area 148 on target 134 at substantially the same time that beam controller 112 directs first beam of energy 130 at first area 132 on target 134.

Position system 114 identifies both first position 138 of first area 132 at which first beam of energy 130 is directed and second position 150 of second area 148 on target 134 at which second beam of energy 146 is directed. Controller 118 uses first position 138 and second position 150 of second area 148 to control movement of vehicle 102.

In some illustrative examples, first position 138, second position 150, and reference position 142 may not be positions directly on target 134. For example, first position 138, second position 150, and reference position 142 may be positions on images of target 134 generated by camera system 141. These positions may be identified with respect to image coordinate system 151 for images generated by camera system 141. As one illustrative example, image coordinate system 151 may be a two-dimensional coordinate system for the images generated by camera system 141.

First position 138 and second position 150 may be the positions of first area 132 and second area 148, respectively, in the images generated by camera system 141 with respect to image coordinate system 151. Reference position 142 may be a pre-defined position, such as the center of the image space with respect to image coordinate system 151.

In these illustrative examples, controller 118 moves vehicle 102 in a manner that reduces difference 152 between first position 138, second position 150, and reference position 142. Difference 152 between first position 138, second position 150, and reference position 142 may include at least one of distance 154 and angle 156.

Distance 154 may be the distance between reference position 142 on target 134 and a centroid between first position 138 and second position 150. The centroid between first position 138 and second position 150 is the position located midway between first position 138 and second position 150 along a line through first position 138 and second position 150. Angle 156 may be an angle formed by this line through first position 138 and second position 150 and a reference line through reference position 142.

Controller 118 moves vehicle 102 to reduce at least one of distance 154 and angle 156. In these illustrative examples, reducing distance 154 may include controller 118 causing vehicle 102 to translate on surface 120. Reducing angle 156 may include controller 118 causing vehicle 102 to rotate. Distance 154 and angle 156 may both be reduced by vehicle 102 translating and rotating simultaneously.

In these illustrative examples, beam controller 112 may be configured to move first beam of energy 130 and/or second beam of energy 146 such that first area 132 and/or second area 148, respectively, on target 134 changes. In particular, movement of first beam of energy 130 and/or second beam of energy 146 causes first position 138 and/or second position 150, respectively, identified by position system 114 to change. Controller 118 in movement system 108 is configured to move vehicle 102 in response to changes in first position 138 and/or second position 150.

In one illustrative example, first beam of energy 130 and second beam of energy 146 may be controlled to cause vehicle 102 to move along desired path 158 on surface 120. For example, first beam of energy 130 and second beam of energy 146 may be moved to move first position 138 of first area 132 at which first beam of energy 130 is directed and second position 150 of second area 148 at which second beam of energy 146 is directed.

As first position 138 and second position 150 on target 134 change with respect to reference position 142, controller 118 moves vehicle 102 in a manner that reduces difference 152 between first position 138 of first area 132, second position 150 of second area 148, and reference position 142. Controller 118 moves vehicle 102 until first position 138 and/or second position 150 stop changing. This type of control takes the form of a feedback loop. In this manner, vehicle 102 may be moved along desired path 158 on surface 120.

In some illustrative examples, target 134 may be associated with gimbal system 160. Gimbal system 160 may be configured to allow target 134 to be moveable in a number of axes. In this manner, an orientation of target 134 may be changed.

In these illustrative embodiments, the use of laser beams and a feedback loop for controlling the movement of vehicle 102 in vehicle control system 106 provides control of the movement of vehicle 102 with a greater accuracy as compared to currently available systems for controlling and tracking the movement of vehicles. Further, with vehicle control system 106, the number of on-board sensors that are needed on vehicle 102 may be reduced as compared to some of the currently available systems for controlling vehicles.

The illustration of vehicle control environment 100 in FIG. 1 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, structure 136 may not be associated with vehicle 102. Instead, energy generation system 110 and beam controller 112 may be associated with vehicle 102 and structure 136 may be a stationary structure in vehicle control environment 100.

In other illustrative examples, first beam of energy 130 and second beam of energy 146 may be generated from the same energy source in number of energy sources 124. For example, both first beam of energy 130 and second beam of energy 146 may be generated from first energy source 128 as split beams.

In still other illustrative examples, a third beam of energy (not shown) may be generated from one of number of energy sources 124. First beam of energy 130, second beam of energy 146, and this third beam of energy may be directed at target 134 in a non-collinear manner. In other words, the three areas illuminated by these three beams of energy may not all lie on a same line. These three beams of energy may be used to provide finer control of the rotation of vehicle 102. In this manner, multiple beams of energy may be directed at target 134 to provide additional control of the movement of vehicle 102.

Figure 2:
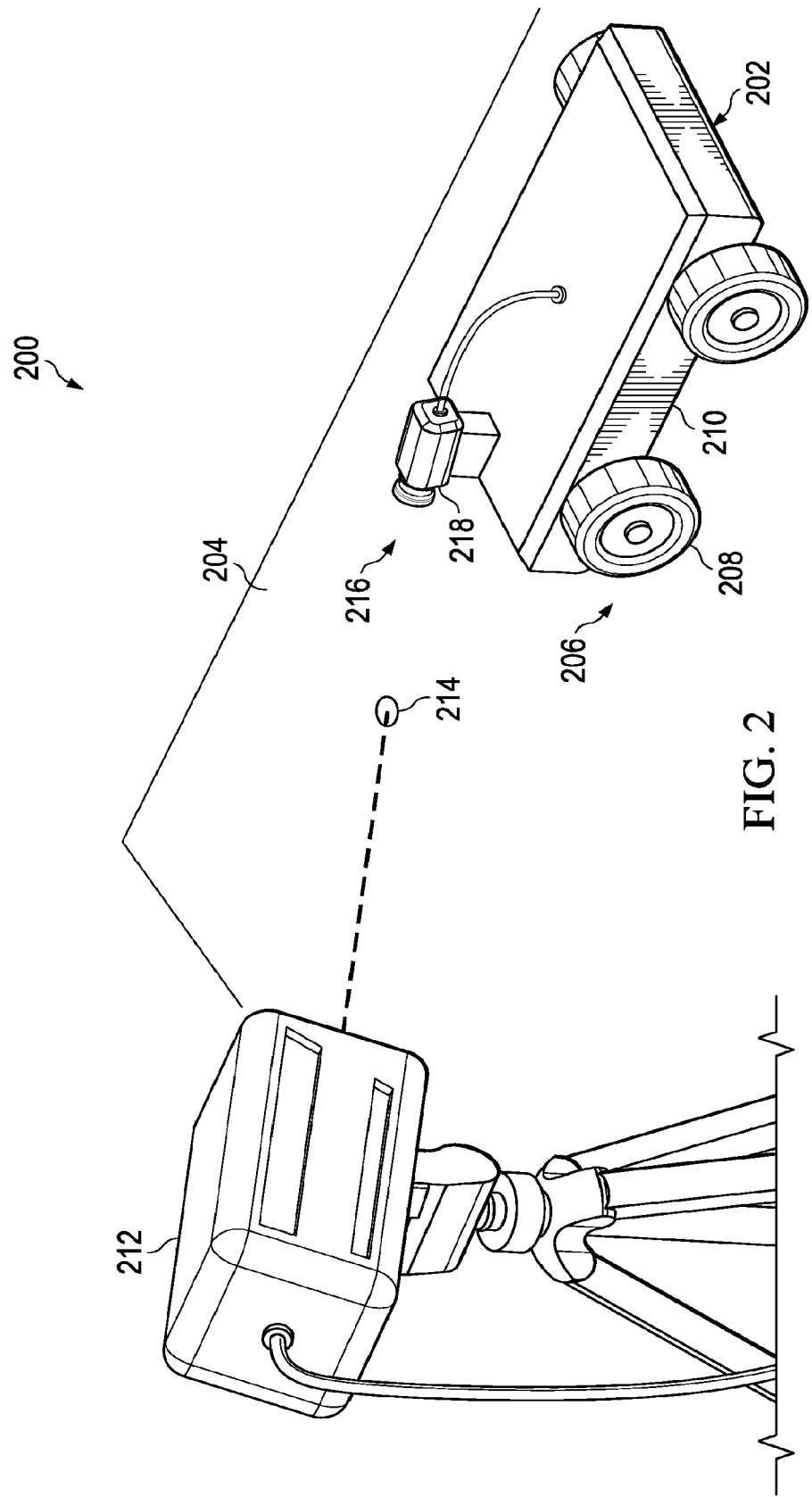
FIG. 2 is an illustration of a vehicle control environment in accordance with an illustrative embodiment.

With reference now to FIG. 2, an illustration of a vehicle control environment is depicted in accordance with an illustrative embodiment. In this illustrative example, vehicle control environment 200 is an example of one implementation for vehicle control environment 100 in FIG. 1.

As depicted, vehicle control environment 200 includes robotic vehicle 202. In this illustrative example, robotic vehicle 202 is an example of one implementation for robotic vehicle 104 in FIG. 1.

Robotic vehicle 202 is configured to move along surface 204 using movement system 206 in this illustrative example. Movement system 206 is an example of one implementation for movement system 108 in FIG. 1. As depicted, movement system 206 includes wheels 208 and a controller (not shown) inside housing 210 for robotic vehicle 202. This controller may be implemented using controller 118 in FIG. 1.

In this depicted example, beam control unit 212 may include an energy generation system and a beam controller such as, for example, energy generation system 110 and beam controller 112, respectively, in vehicle control system 106 in FIG. 1. Beam control unit 212 is configured to generate a beam of light that illuminates an area on surface 204. This area is illuminated area 214. Surface 204 is an example of one implementation for target 134 in FIG. 1.

Additionally, in this illustrative example, position system 216 associated with robotic vehicle 202 is an example of one implementation for position system 114 in FIG. 1. Position system 216 includes camera system 218 and a processor unit (not shown) inside of housing 210.

Position system 216 is configured to identify the position of illuminated area 214 using images generated by camera system 218. In particular, the position of illuminated area 214 may be identified in images generated by camera system 218 with respect to an image coordinate system for these images. Position system 216 sends this information to the controller of movement system 206.

The controller causes robotic vehicle 202 to move to reduce a difference between the position of illuminated area 214 in the images generated by camera system 218 and a reference position that has been pre-defined for the images. The reference position may be, for example, without limitation, the center of the images generated by camera system 218. Further, the reference position remains fixed in the different images generated by camera system 218 as robotic vehicle 202 moves.

Figure 3:
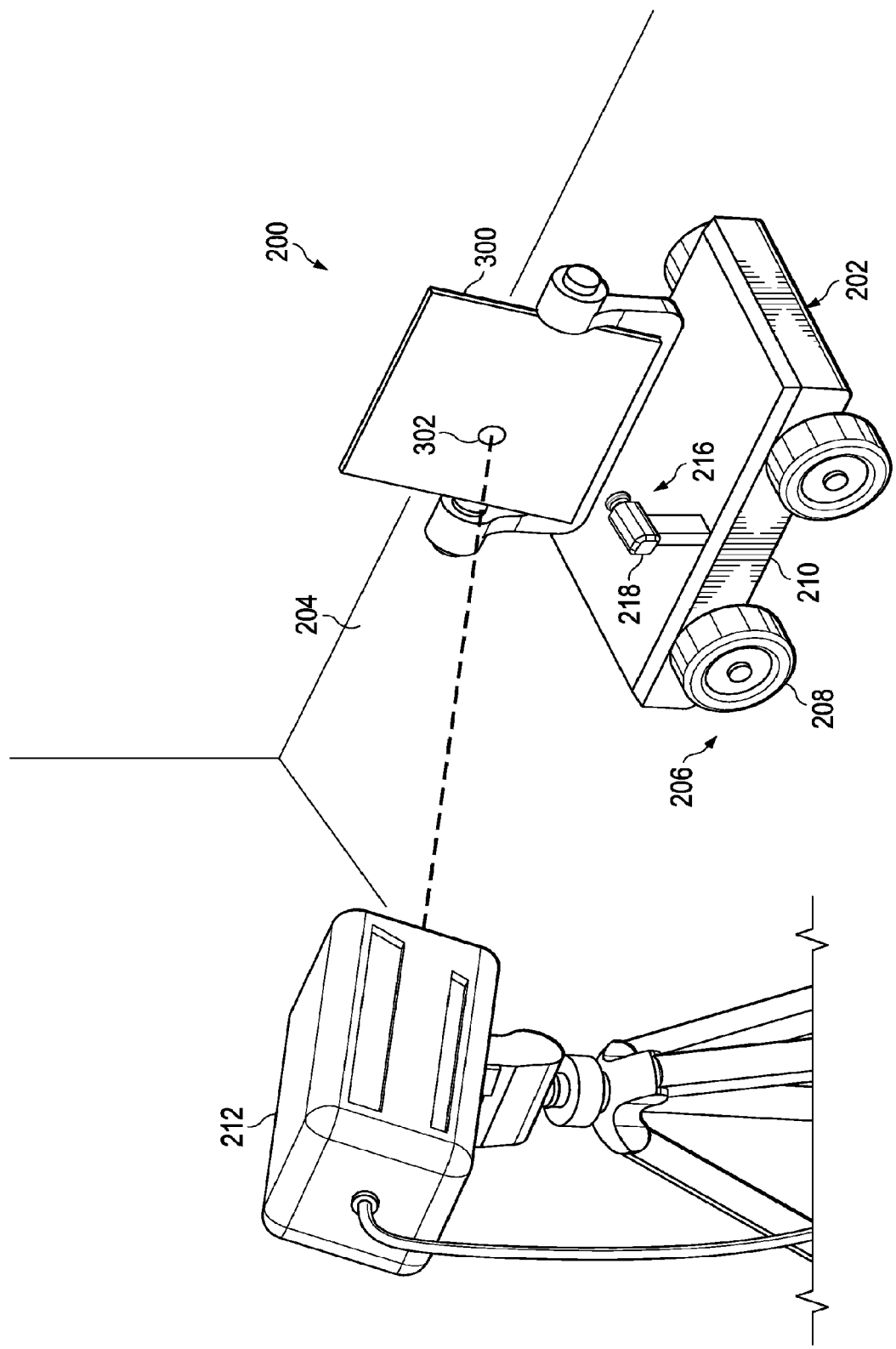
FIG. 3 is an illustration of a vehicle control environment in accordance with an illustrative embodiment.

With reference now to FIG. 3, an illustration of a vehicle control environment is depicted in accordance with an illustrative embodiment. In this illustrative example, surface 204 is not the target for robotic vehicle 202 in vehicle control environment 200 in FIG. 3. Instead, structure 300 is associated with robotic vehicle 202. Structure 300 is a substantially planar structure in this illustrative example.

As depicted, beam control unit 212 is configured to generate a laser beam that illuminates area 302 on structure 300. The controller for robotic vehicle 202 may move robotic vehicle 202 on surface 204 in a manner that reduces a distance between a position identified for area 302 on structure 300 and a reference position on structure 300.

Further, as depicted, camera system 218 for position system 216 has been moved on robotic vehicle 202. Camera system 218 is positioned such that camera system 218 can generate images of structure 300 with area 302 illuminated.

Figure 4:
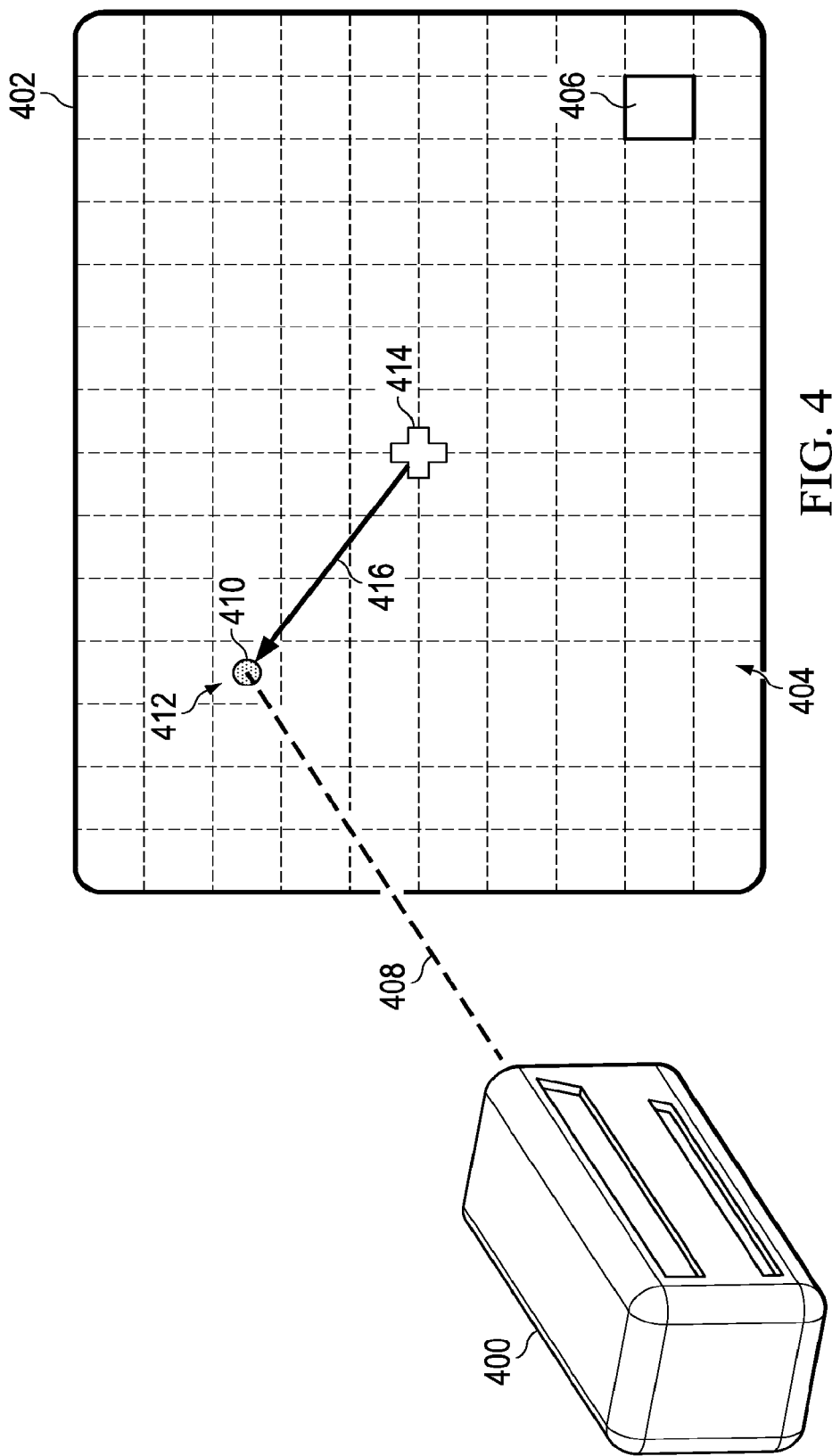
FIG. 4 is an illustration of a beam control unit and a target in accordance with an illustrative embodiment.

With reference now to FIG. 4, an illustration of a beam control unit and a target is depicted in accordance with an illustrative embodiment. In this depicted example, beam control unit 400 includes an energy generation system and a beam controller such as, for example, energy generation system 110 and beam controller 112, respectively, in vehicle control system 106 in FIG. 1.

Target 402 may be an example of one implementation of target 134 in FIG. 1. Target 402 is for a vehicle, such as vehicle 102 in FIG. 1. In this illustrative example, target 402 includes array of sensors 404. The sensors in array of sensors 404 may be light sensors. Light sensor 406 is an example of one sensor element in array of sensors 404. Array of sensors 404 is configured to detect light from a beam, such as a laser beam.

As depicted, beam control unit 400 generates beam 408. Beam 408 is a laser beam in this illustrative example. Beam 408 illuminates area 410 on target 402. Area 410 has position 412 on target 402. Position 412, in this illustrative example, may be the centroid of the particular light sensor in array of sensors 404 that is in area 410 and detects beam 408.

In this depicted example, reference position 414 is a position that has been pre-defined on target 402. A controller for the vehicle, such as controller 118 in FIG. 1, may use position 412 and reference position 414 to move the vehicle.

In particular, the controller computes vector 416. Vector 416 indicates the magnitude of the distance between reference position 414 and position 412. Further, vector 416 indicates the direction of position 412 with respect to reference position 414. The controller may cause the vehicle to move in a direction that corresponds to the direction of vector 416.

For example, target 402 may be a component located onboard the vehicle that moves with the vehicle as the vehicle moves. A direction of vector 416 with respect to this reference plane represents an input parameter that may be used by a controller, such as controller 118 in FIG. 1, to move the vehicle. A desired direction of movement of the vehicle is determined using the direction of vector 416 and the position and/or orientation of target 402 relative the vehicle. The controller may cause the vehicle to move from its current position along the desired direction of movement.

Figure 5:
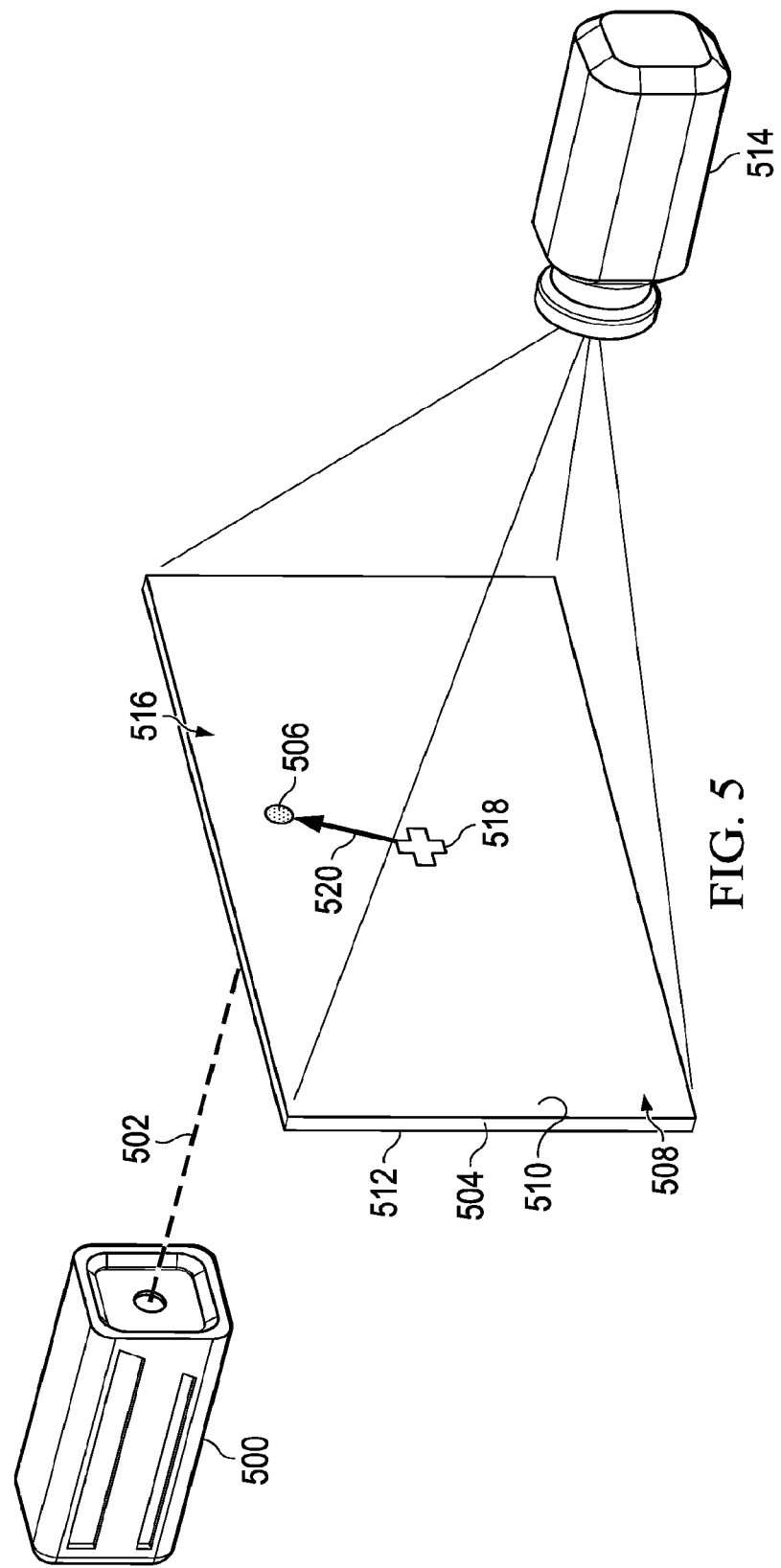
FIG. 5 is an illustration of another beam control unit with another type of target in accordance with an illustrative embodiment.

With reference now to FIG. 5, an illustration of another beam control unit with another type of target is depicted in accordance with an illustrative embodiment. In this illustrative example, beam control unit 500 is configured to generate beam 502 and direct beam 502 at target 504. In particular, beam 502 illuminates area 506 on target 504.

Target 504 is an example of one implementation of target 134 for vehicle 102 in FIG. 1. In this illustrative example, target 504 takes the form of diffusion filter 508. Diffusion filter 508 allows area 506 to be illuminated on side 510 of diffusion filter 508 even though beam 502 is directed at side 512 of diffusion filter 508.

Camera system 514 is an example of one implementation for camera system 141 in position system 114 in FIG. 1. Camera system 514 generates images of target 504 with area 506 illuminated from side 510 of diffusion filter 508.

As depicted, a controller in the vehicle, such as controller 118 in FIG. 1, uses position 516 of area 506 illuminated by beam 502 and reference position 518 on diffusion filter 508 to compute vector 520. The controller may use vector 520 to cause the vehicle to move in a direction that corresponds to the direction of vector 520.

Figure 6:
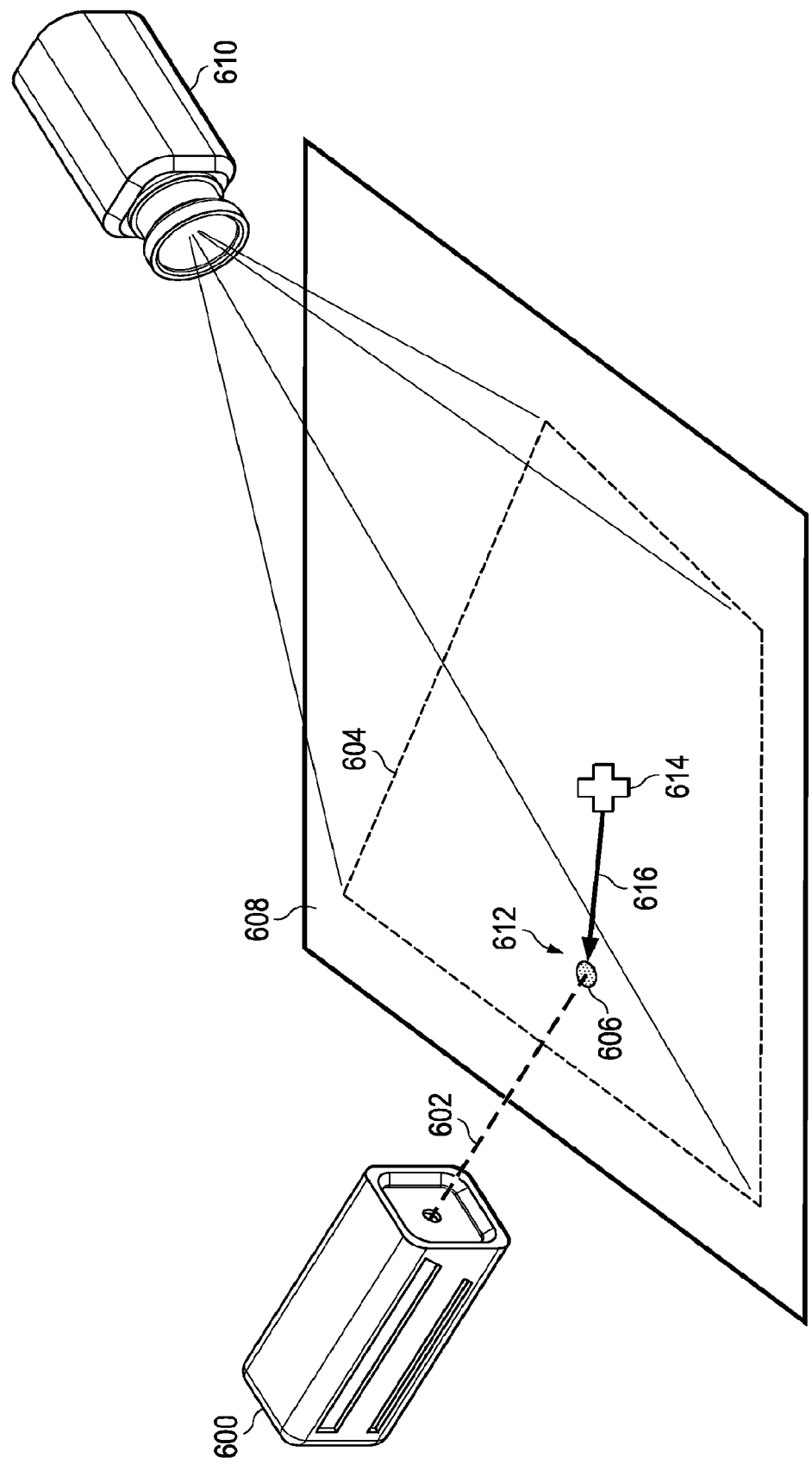
FIG. 6 is an illustration of a beam control unit and another type of target in accordance with an illustrative embodiment.

With reference now to FIG. 6, an illustration of a beam control unit and another type of target is depicted in accordance with an illustrative embodiment. In this illustrative example, beam control unit 600 is configured to generate beam 602 and direct beam 602 towards target 604. In particular, beam 602 illuminates area 606 on target 604.

In this illustrative example, target 604 is another example of one implementation for target 134 for vehicle 102 in FIG. 1. Target 604 takes the form of a region of surface 608 in this example.

As depicted, camera system 610 is configured to generate images of target 604 on surface 608 with area 606 illuminated. A controller on the vehicle, such as controller 118 in FIG. 1, uses position 612 of area 606 on target 604 and reference position 614 to computer vector 616. The controller may move the vehicle in a direction corresponding to a direction of vector 616 to move the vehicle along a desired path.

Figure 7:
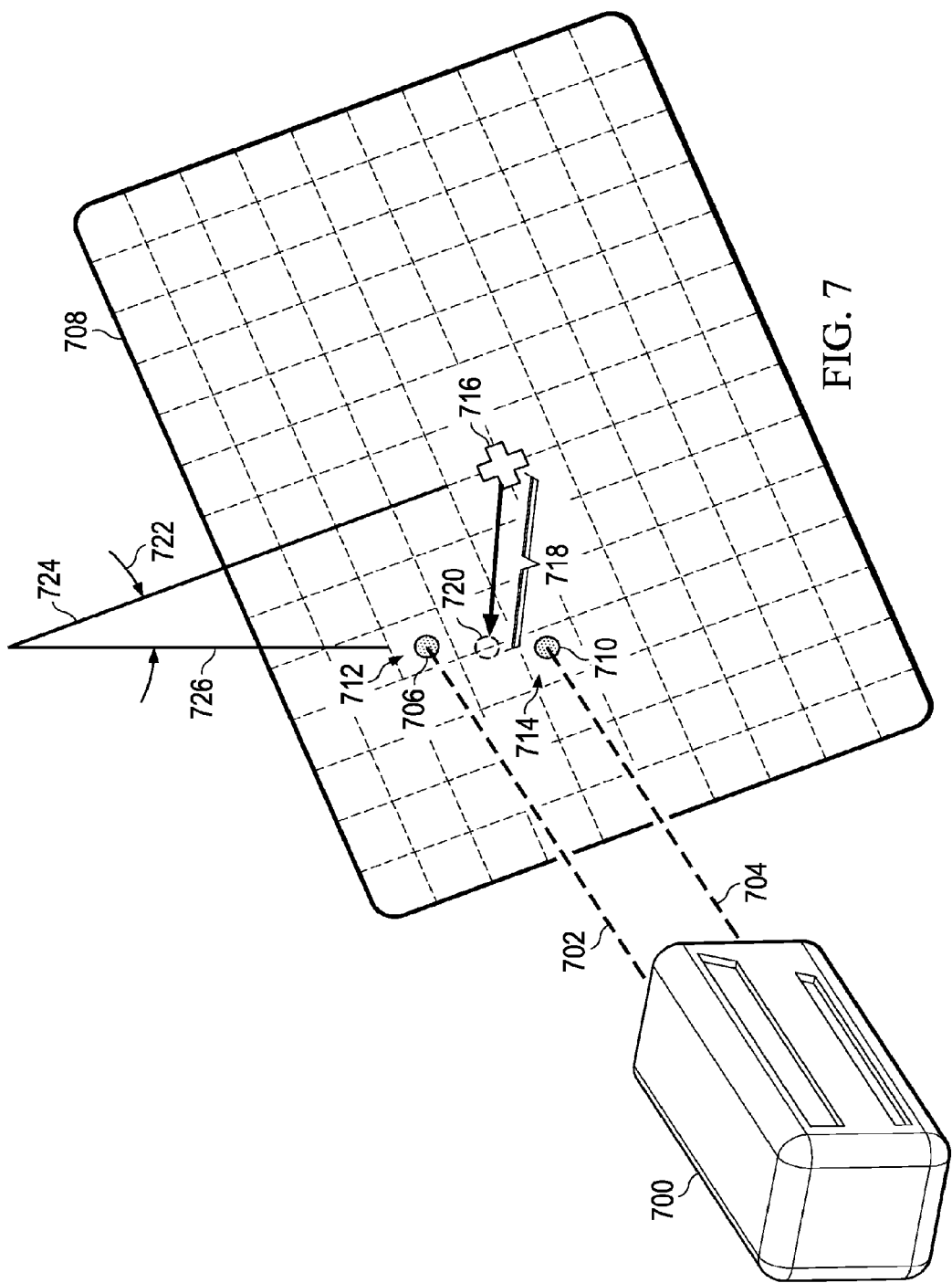
FIG. 7 is an illustration of a beam control unit and a target in accordance with an illustrative embodiment.

With reference now to FIG. 7, an illustration of a beam control unit and a target is depicted in accordance with an illustrative embodiment. In this illustrative example, beam control unit 700 is configured to generate beam 702 and beam 704. Beam control unit 700 directs beam 702 at first area 706 on target 708 and beam 704 at second area 710 on target 708.

In this depicted example, a controller on the vehicle, such as controller 118 in FIG. 1, may move the vehicle in a manner that reduces the difference between first position 712 of first area 706, second position 714 of second area 710, and reference position 716. This difference may comprise at least one of distance 718 between reference position 716 and centroid 720 and angle 722 between reference line 724 and line 726 through first position 712 and second position 714.

Centroid 720 is at the midway position between first position 712 and second position 714 along line 726 through first position 712 and second position 714, in this illustrative example. Reference line 724 is a line through reference position 716. Reference line 724 may, for example, correspond to a direction in front of the vehicle at a starting location of the vehicle.

Figure 8:
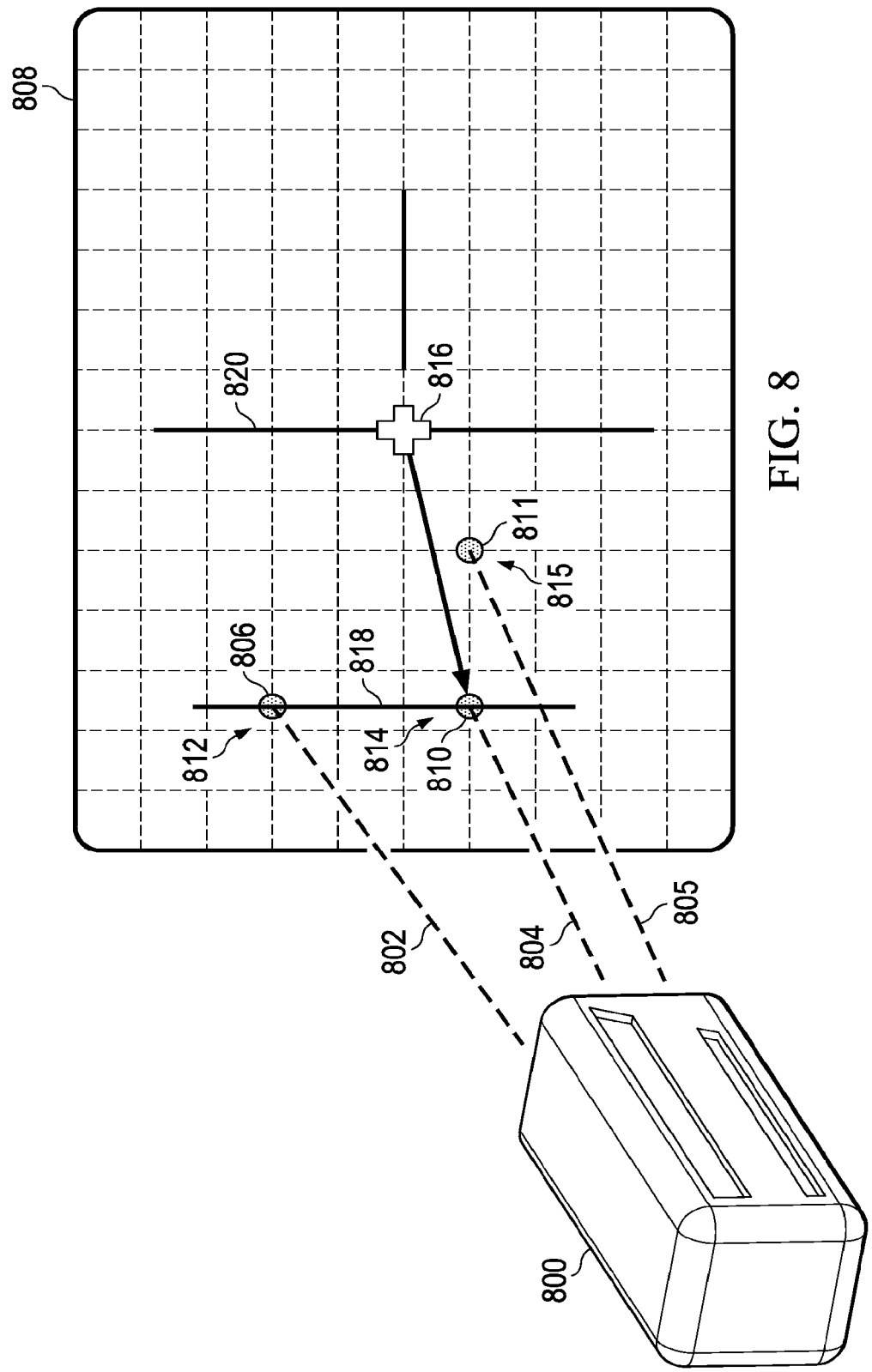
FIG. 8 is an illustration of a beam control unit and a target in accordance with an illustrative embodiment.

With reference now to FIG. 8, an illustration of a beam control unit and a target is depicted in accordance with an illustrative embodiment. In this illustrative example, beam control unit 800 is configured to generate beam 802, beam 804, and beam 805. Beam control unit 800 directs beam 802 at first area 806 on target 808, beam 804 at second area 810 on target 808, and beam 804 at third area 811. In particular, first area 806, second area 810, and third area 811 at which beams 802, 804, and 805, respectively, are directed may have a non-collinear arrangement in this example. In this illustrative example, a non-collinear arrangement for first area 806, second area 810, and third area 811 is an arrangement in which at least one of first area 806, second area 810, and third area 811 do not lie along a substantially same line as the other areas.

In this depicted example, a controller on the vehicle, such as controller 118 in FIG. 1, may move the vehicle in a manner that reduces the difference between first position 812 of first area 806, second position 814 of second area 810, third position 815 of third area 811, and reference position 816.

A system that uses three beams to illuminate three non-collinear areas on the surface of target 808 may allow additional rotational degrees of freedom to be measured as compared to using two beams. For example, target 808 may rotate about line 818 through first area 806 illuminated by beam 802 and second area 810 illuminated by beam 804. When only beam 802 and beam 804 are generated by beam control unit 800 and beam 805 is not generated, a measurement of the angle formed between line 818 and reference line 820 caused by rotation of target 808 about line 818 may not be possible.

However, the addition of beam 805 to beam 802 and beam 804 allows this rotation to be observed and the angle measured. In this manner, three beams provide an additional rotation degree of freedom that may be measured. For example, when target 808 rotates about line 818, third position 815 of third area 811 on target 808 may move further away from or closer to line 818. Geometry may be used to measure the angular offset between reference line 820 and line 818.

Further, a difference between reference position 814 and first area 806, second area 810, and third area 811 may be used to control movement of the vehicle. For example, a distance between reference position 816 and a centroid for first position 812, second position 814, and third position 815 may be measured. The vehicle may be controlled to reduce this distance. In other illustrative examples, the vehicle may be controlled to reduce the distance between reference position 816 and any one of first position 812, second position 814, and third position 815 instead of the centroid for these areas.

Additionally, the relative distance between first position 812, second position 814, and third position 815 may be used to calculate the angular components of rotation of target 808 with respect to reference line 820 that are not about an axis substantially parallel to the axis substantially normal to the surface of target 808. The vehicle may be controlled to reduce these angular components to substantially zero degrees.

With reference now to FIGS. 9-15, illustrations of a target with different positions for areas on the target illuminated by laser beams relative to a reference position on the target are depicted in accordance with an illustrative embodiment. In these illustrative examples, target 900 is an example of one implementation for target 134 in FIG. 1.

Further, in these illustrative examples, target 900 may take the form of a structure associated with a vehicle, such as structure 136 associated with vehicle 102 in FIG. 1. In this manner, movement of the vehicle causes target 900 to move.

A controller for a vehicle, such as controller 118 for vehicle 102 in FIG. 1, may use the positions of the areas illuminated by the laser beams to control the movement of the vehicle. The laser beams may be generated by, for example, energy generation system 110 in FIG. 1.

Figure 9:
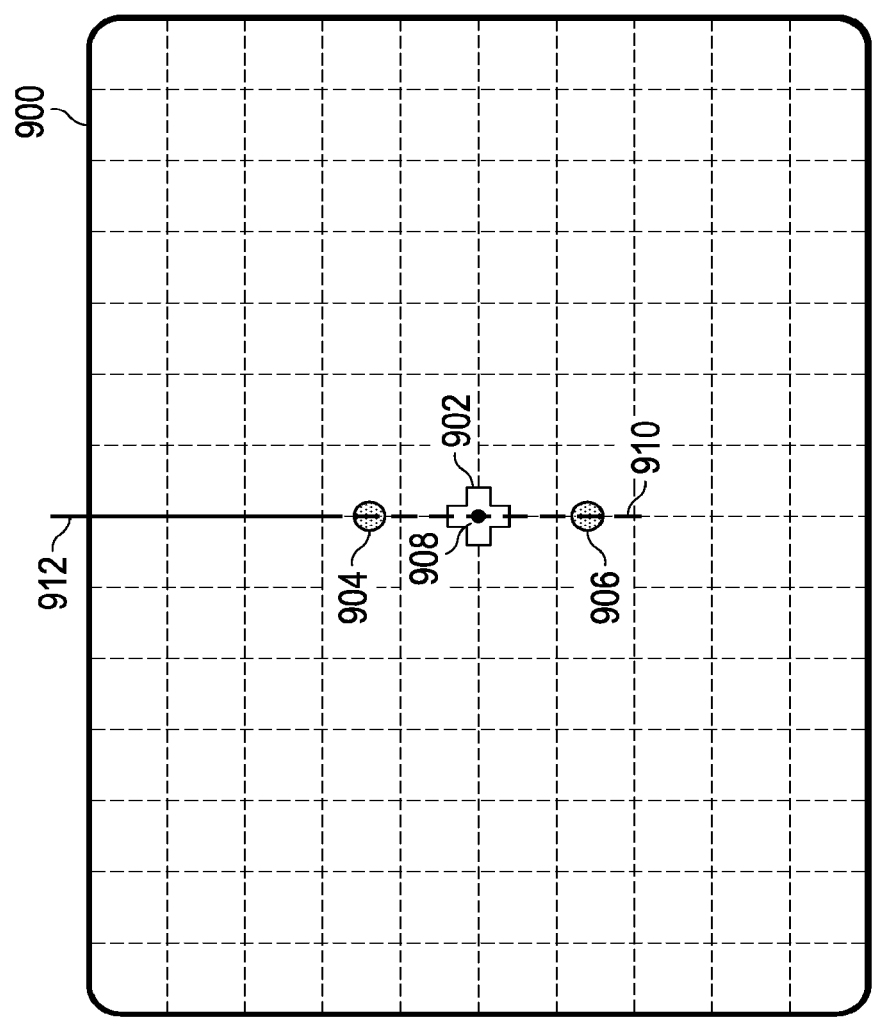
FIG. 9 is an illustration of a target with different positions for areas on the target illuminated by laser beams relative to a reference position on the target in accordance with an illustrative embodiment.

Turning now to FIG. 9, reference position 902 on target 900 has been pre-defined. First position 904 and second position 906 are the positions identified for areas on target 900 at which laser beams have been directed. In particular, first position 904 and second position 906 are the positions identified for areas on target 900 that have been illuminated by laser beams.

In this illustrative example, centroid 908 for first position 904 and second position 906 is located at the midway position between first position 904 and second position 906 along line 910 through first position 904 and second position 906. As depicted, centroid 908 is at the same position as reference position 902.

Further, in this illustrative example, line 910 through first position 904 and second position 906 is substantially parallel to reference line 912 that passes through reference position 902. In this manner, an angle between line 910 and reference line 912 is substantially zero degrees. Reference line 912 is a vertical reference line through reference position 902 with respect to target 900. In other words, reference line 912 may not move when target 900 is rotated about an axis through reference position 902.

The controller does not move the vehicle when the centroid 908 is at reference position 902 and line 910 is substantially parallel to reference line 912. In other words, first position 904 and second position 906 indicate a neutral state for the controller and the vehicle.

With reference now to FIG. 10, first position 904 and second position 906 have been moved away from reference position 902. In particular, centroid 908 for first position 904 and second position 906 has been moved away from reference position 902. However, as depicted, line 910 remains substantially parallel to reference line 912 in this illustrative example.

The controller computes vector 1000 that indicates the magnitude of the distance between reference position 902 and centroid 908 and the direction of centroid 908 relative to reference position 902. The controller may move the vehicle in a direction corresponding to the direction of vector 1000 to reduce the distance between centroid 908 and reference position 902. When line 910 is substantially parallel to reference line 912, this movement may be translation.

In these illustrative examples, movement of the vehicle may cause target 900 and, as a result, reference position 902, to also move relative to the laser beams. In this manner, first position 904 and second position 906 for the areas on target 900 illuminated by the laser beams may move relative to reference position 902.

In FIG. 11, the vehicle has been moved such that line 910 through first position 904 and second position 906 is again substantially parallel to reference line 912 and centroid 908 is again at reference position 902. In particular, the vehicle is moved such that reference position 902 moves with target 900 in the direction of arrow 1100.

Figure 12:
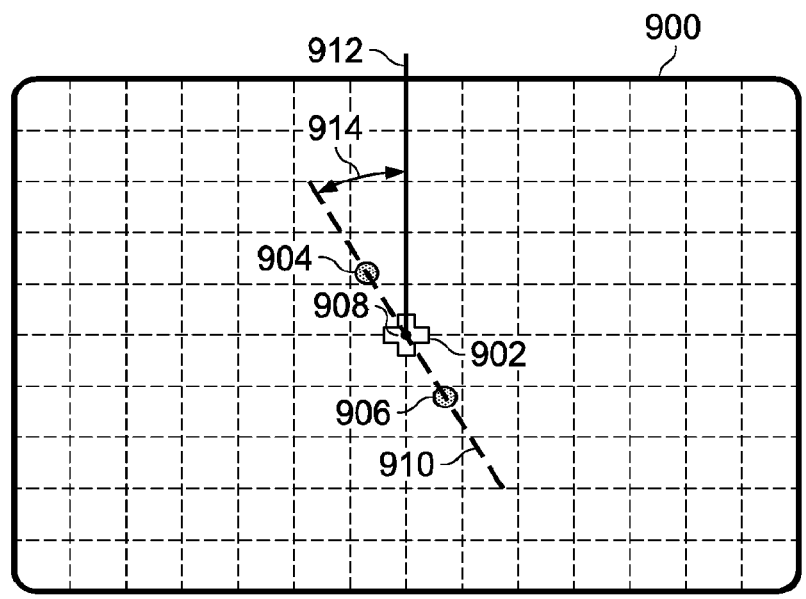
FIG. 12 is an illustration of a target with different positions for areas on the target illuminated by laser beams relative to a reference position on the target in accordance with an illustrative embodiment.

With reference now to FIG. 12, first position 904 and second position 906 have moved such that line 910 through first position 904 and second position 906 is no longer substantially parallel to reference line 912. However, centroid 908 is at reference position 902. In this illustrative example, the controller may move the vehicle such that angle 914 formed between line 910 and reference line 912 is reduced. In particular, the vehicle is rotated such that angle 914 and reference line 912 is reduced to about zero degrees.

Figure 13:
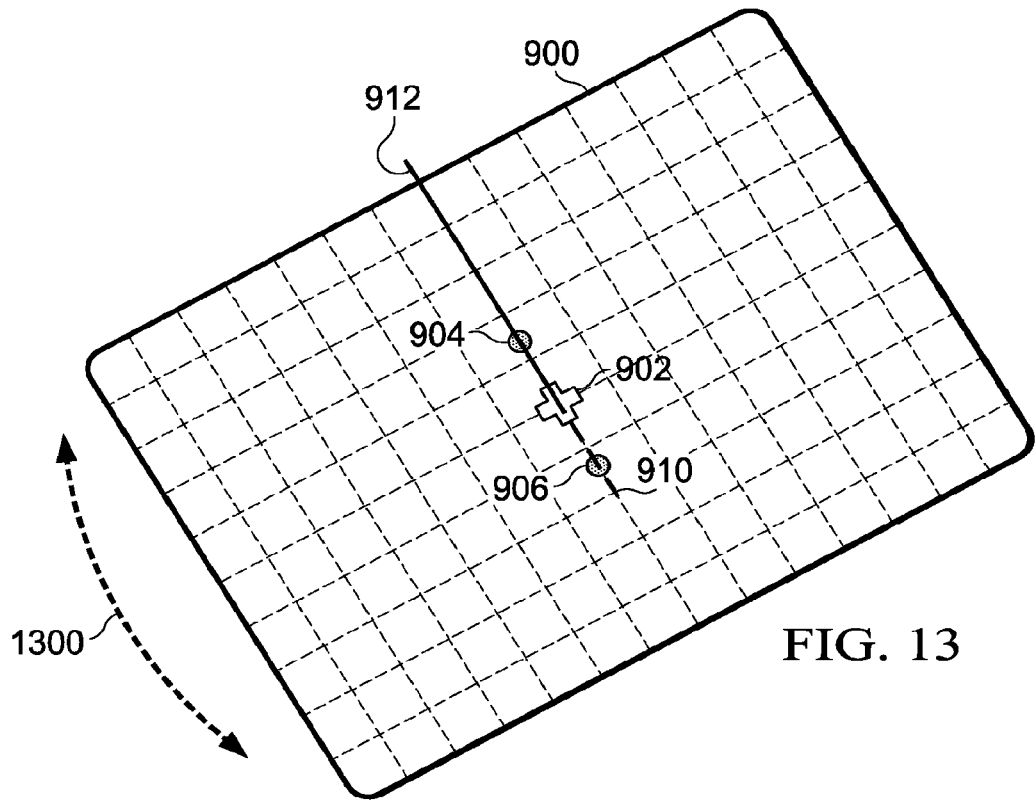
FIG. 13 is an illustration of a target with different positions for areas on the target illuminated by laser beams relative to a reference position on the target in accordance with an illustrative embodiment.

In FIG. 13, the vehicle has been rotated in the direction of arrow 1300 such that target 900 and reference position 902 on target 900 are also rotated. As depicted, rotation of the vehicle and target 900 causes line 910 to again be substantially parallel with reference line 912. In this manner, angle 914 between line 910 and reference line 912 in FIG. 12 is reduced to about zero degrees.

Figure 14:
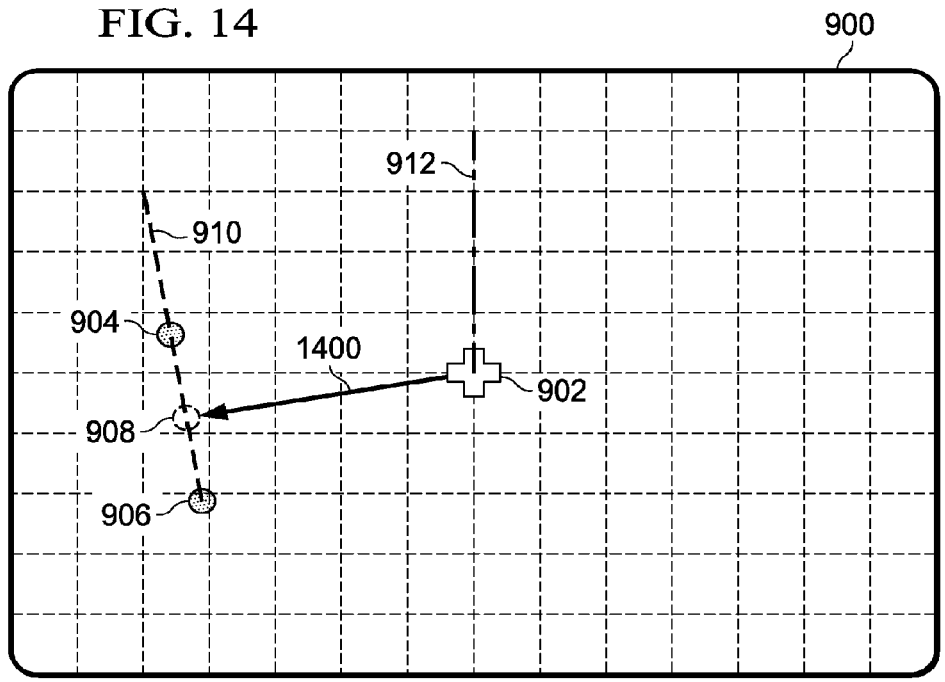
FIG. 14 is an illustration of a target with different positions for areas on the target illuminated by laser beams relative to a reference position on the target in accordance with an illustrative embodiment.

Turning now to FIG. 14, first position 904 and second position 906 have moved on target 900 such that centroid 908 is moved away from reference position 902 and line 910 is no longer substantially parallel to reference line 912. The controller computes vector 1400 that indicates the magnitude of the distance between reference position 902 and centroid 908 and the direction of centroid 908 relative to reference position 902. The controller may move the vehicle using both translation and rotation to reduce the distance between centroid 908 and reference position 902 as well as the angle formed between line 910 and reference line 912.

Figure 15:
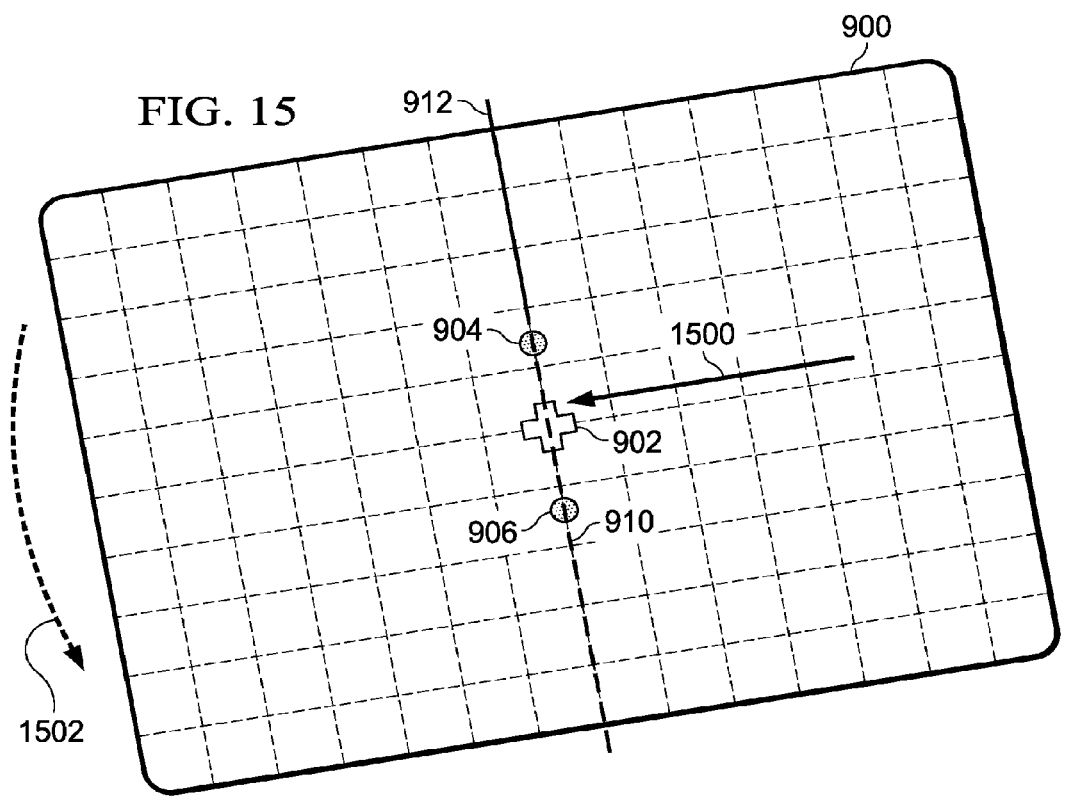
FIG. 15 is an illustration of a target with different positions for areas on the target illuminated by laser beams relative to a reference position on the target in accordance with an illustrative embodiment.

In FIG. 15, the vehicle has translated in the direction of arrow 1500 and rotated in the direction of arrow 1502. The translation of the vehicle also moves target 900 and reference position 902 on target 900 relative to the laser beams such that first position 904 and second position 906 are moved on target 900. Further, rotation of the vehicle rotates target 900 such that line 910 is again substantially parallel to reference line 912.

In this manner, different types of positions for areas on target 900 that may be illuminated by laser beams and different types of compensation maneuvers for these different types of positions are described in FIGS. 9-15. The vehicle with which target 900 is associated may be moved using translation and/or rotation to reduce the difference between first position 904, second position 906, and reference position 902.

With reference now to FIGS. 16-19, illustrations of a top view of a beam control unit directing laser beams at a target associated with a vehicle are depicted in accordance with an illustrative embodiment. These laser beams are directed at the target to control the movement of the vehicle.

Figure 16:
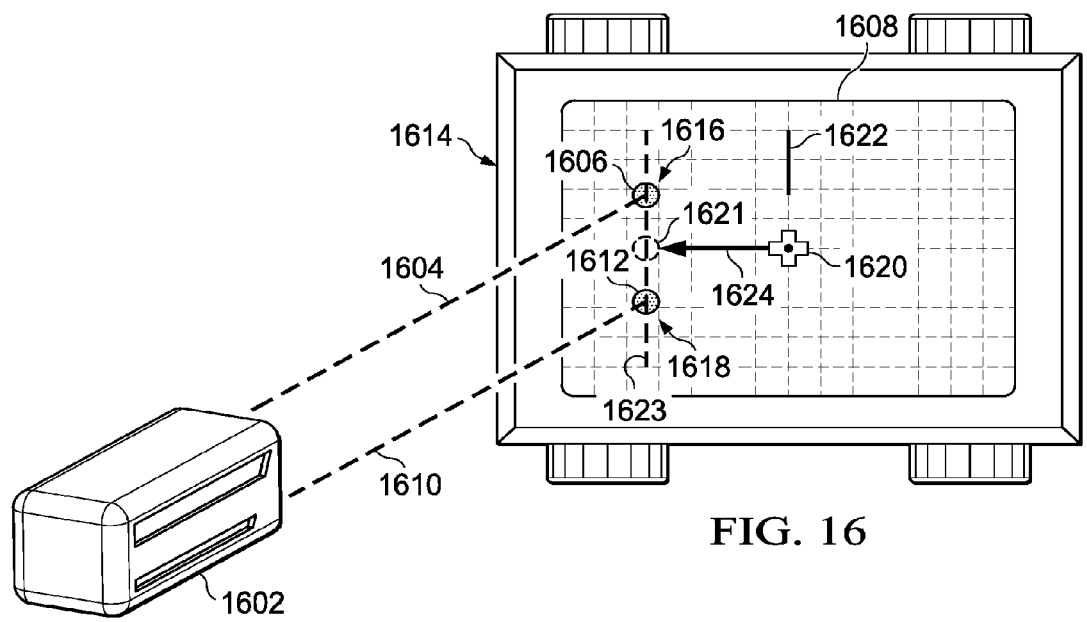
FIG. 16 is an illustration of a top view of a beam control unit directing laser beams at a target associated with a vehicle in accordance with an illustrative embodiment.

In FIG. 16, beam control unit 1602 generates laser beam 1604 that illuminates first area 1606 on target 1608 and laser beam 1610 that illuminates second area 1612 on target 1608. Target 1608 is associated with vehicle 1614.

First position 1616 of first area 1606 and second position 1618 of second area 1612 are on target 1608 away from reference position 1620. In particular, centroid 1621 for first position 1616 and second position 1618 is located away from reference position 1620. However, line 1623 through first position 1616 and second position 1618 is substantially parallel to reference line 1622 through reference position 1620.

A controller (not shown) for vehicle 1614, such as controller 118 for vehicle 102 in FIG. 1, may compute vector 1624. The controller may move vehicle 1614 in a direction of vector 1624 to move target 1608 and reference position 1620 relative to laser beam 1604 and laser beam 1610. This movement may cause first position 1616 of first area 1606 and second position 1618 of second area 1612 on target 1608 to change.

Figure 17:
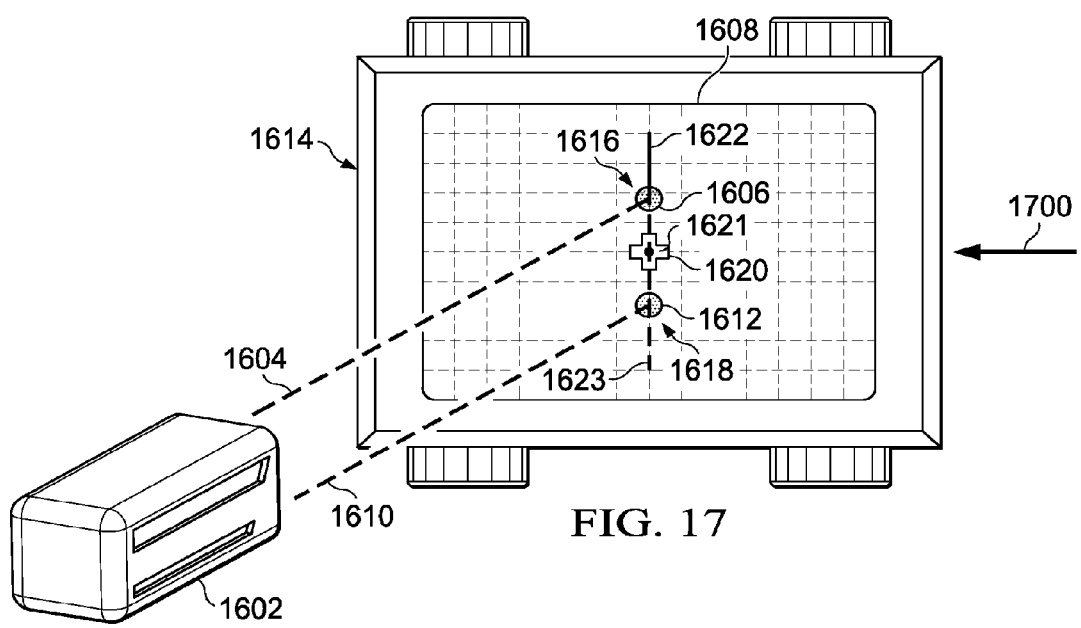
FIG. 17 is an illustration of a top view of a beam control unit directing laser beams at a target associated with a vehicle in accordance with an illustrative embodiment.

With reference now to FIG. 17, vehicle 1614 from FIG. 16 has moved relative to laser beam 1604 and laser beam 1610 in the direction of arrow 1700. In this illustrative example, vehicle 1614 moves such that centroid 1621 is at reference position 1620 and line 1623 remains substantially parallel to reference line 1622. In other words, the vehicle translates.

Figure 18:
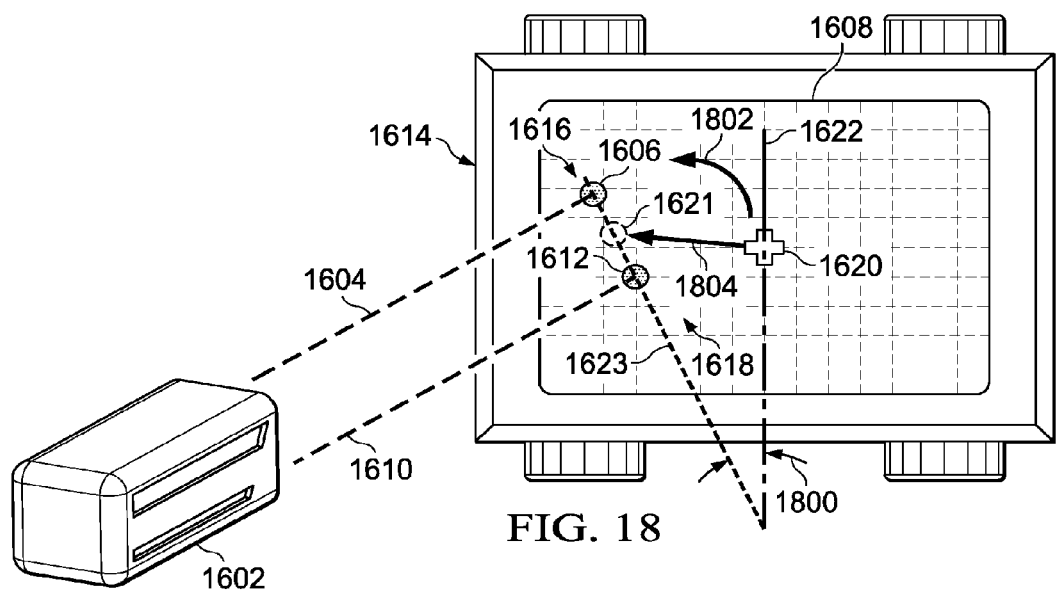
FIG. 18 is an illustration of a top view of a beam control unit directing laser beams at a target associated with a vehicle in accordance with an illustrative embodiment.

With reference now to FIG. 18, first position 1616 of first area 1606 and second position 1618 of second area 1612 have changed as compared to first position 1616 and second position 1618 in FIG. 17. As depicted, line 1623 through first position 1616 of first area 1606 and second position 1618 of second area 1612 is no longer substantially parallel to reference line 1622. Further, centroid 1621 has been moved away from reference position 1620.

In this illustrative example, the controller identifies angle 1800 between reference line 1622 and line 1623. The controller identifies a direction of rotation for vehicle 1614 to reduce angle 1800 to substantially zero. This direction is the direction of arrow 1802 in this illustrative example.

Further, the controller computes vector 1804. The controller may move vehicle 1614 in a direction corresponding to the direction of vector 1804. In other words, vehicle 1614 may translate in a direction corresponding to the direction of vector 1804.

Figure 19:
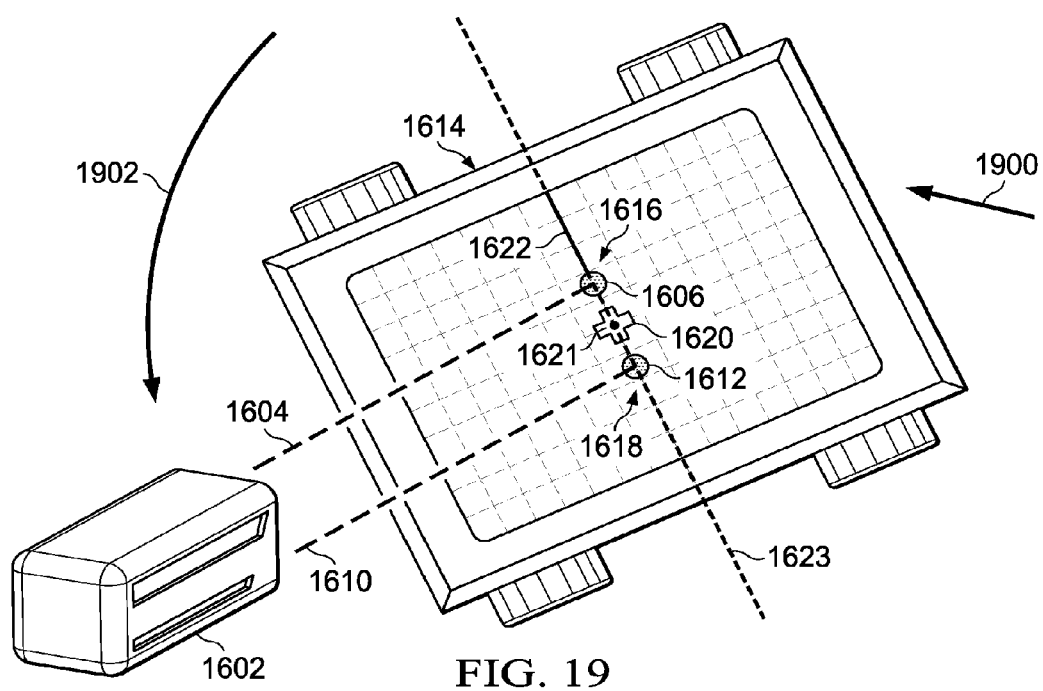
FIG. 19 is an illustration of a top view of a beam control unit directing laser beams at a target associated with a vehicle in accordance with an illustrative embodiment.

With reference now to FIG. 19, vehicle 1614 has translated in the direction of arrow 1900 and rotated in the direction of arrow 1902 such that centroid 1621 is at reference position 1620 and line 1623 remains substantially parallel to reference line 1622.

Figure 20:
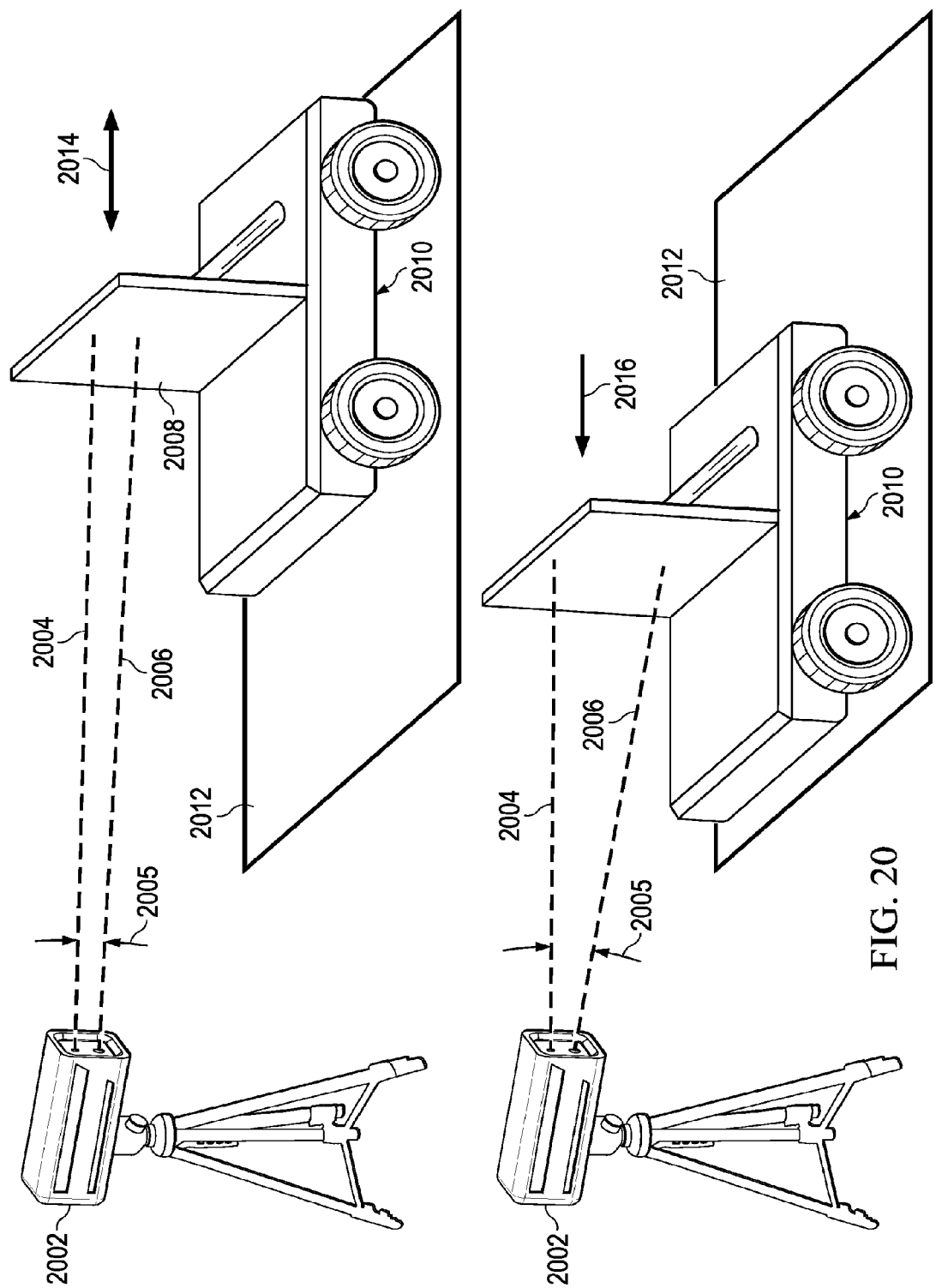
FIG. 20 is an illustration of an adjustment to the angle between two laser beams directed at a target in accordance with an illustrative embodiment.

Turning now to FIG. 20, an illustration of an adjustment to the angle between two laser beams directed at a target is depicted in accordance with an illustrative embodiment. In this illustrative example, beam control unit 2002 is configured to generate laser beam 2004 and laser beam 2006. These laser beams are directed at target 2008 associated with vehicle 2010.

When angle 2005 between laser beam 2004 and laser beam 2006 is a fixed angle, the controller for vehicle 2010 may be unable to control movement of vehicle 2010 on surface 2012 in desired direction 2014. Desired direction 2014 is a direction that is directly towards and/or away from beam control unit 2002. In this illustrative example, angle 2005 may be adjusted to control the movement of vehicle 2010 in desired direction 2014.

For example, as depicted, when beam control unit 2002 adjusts angle 2005 to make angle 2005 wider, the controller for vehicle 2010 causes vehicle 2010 to move along surface 2012 in the direction of arrow 2016. Similarly, in other illustrative examples, beam control unit 2002 may make angle 2005 narrower to cause the controller for vehicle 2010 to move vehicle 2010 in a direction opposite of arrow 2016.

In other illustrative examples, three laser beams may be generated by beam control unit 2002. An angle may be formed between the first laser beam and the third laser beam and another angle may be formed between the second laser beam and the third laser beam. In other words, two angles that define the relative orientation of two of the beams relative to the third beam may be formed. These two angles may be made wider and/or narrower such that the vehicle may be controlled to move along an axis between the vehicle and beam control unit 2002.

Additionally, the angular displacement between the multiple beam areas on target 2008 may be used to produce an estimate of the distance to target 2008. This type of distance measurement may take place when at least one of the beams is not parallel to at least one of the other beams.

Figure 21:
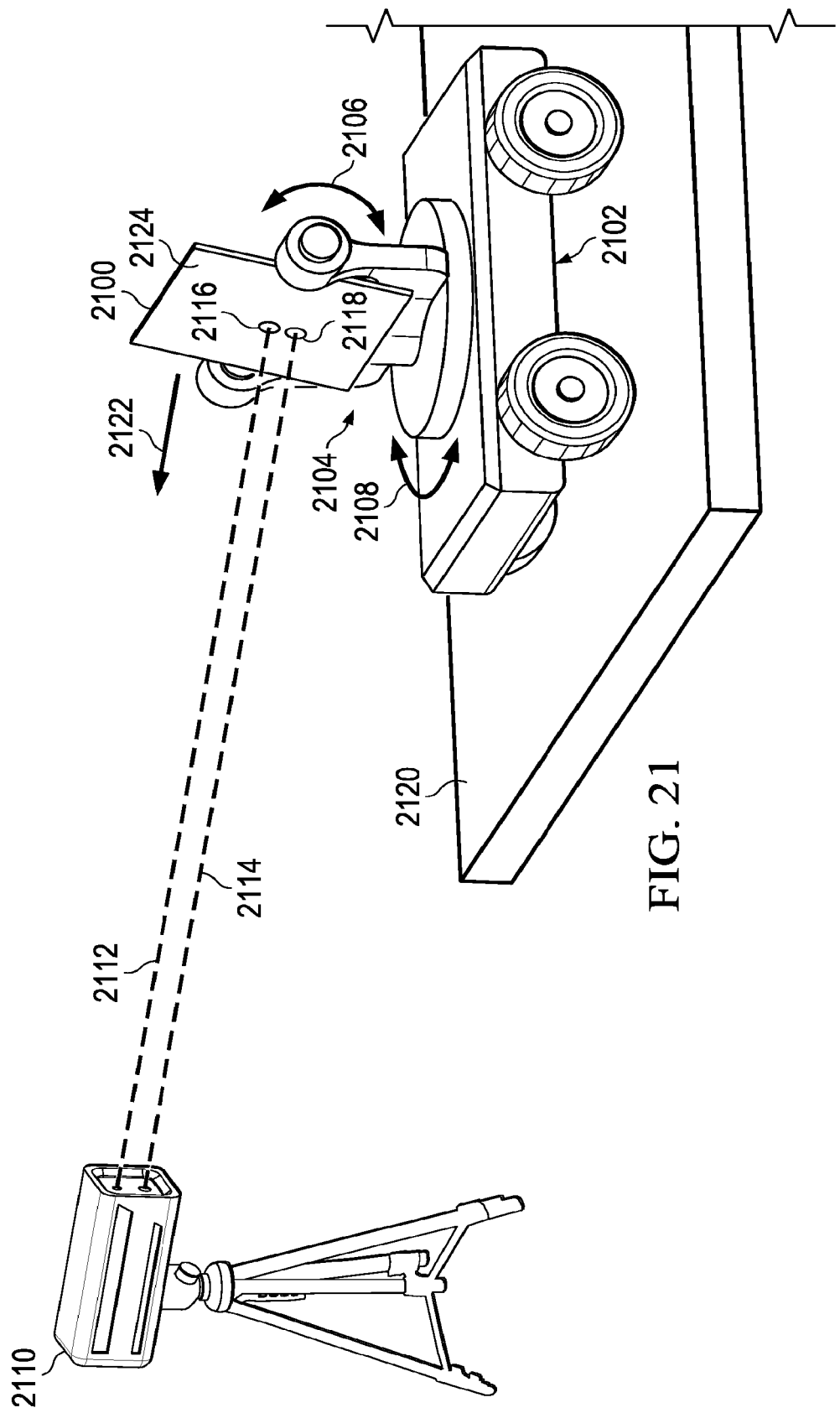
FIG. 21 is an illustration of a target for a vehicle associated with a gimbal system in accordance with an illustrative embodiment.

With reference now to FIG. 21, an illustration of a target for a vehicle associated with a gimbal system is depicted in accordance with an illustrative embodiment. In this illustrative example, target 2100 is associated with vehicle 2102. In particular, target 2100 is associated with gimbal system 2104 that is associated with vehicle 2102.

In this illustrative example, gimbal system 2104 is an example of one implementation for gimbal system 160 in FIG. 1. Gimbal system 2104 provides target 2100 with two different types of rotation. In particular, gimbal system 2104 allows target 2100 to rotate in the direction of arrow 2106 and in the direction of arrow 2108.

As depicted, beam control unit 2110 is configured to generate laser beam 2112 and laser beam 2114 that illuminate area 2116 and area 2118, respectively, on target 2100. Gimbal system 2104 is configured to rotate target 2100 as vehicle 2102 moves along surface 2120 such that axis 2122 through target 2100 remains pointed at beam control unit 2110. Axis 2122 is a normal axis for target 2100. In other words, axis 2122 through target 2100 is substantially perpendicular to surface 2124 of target 2100.

In this manner, gimbal system 2104 is configured to align target 2100 with respect to beam control unit 2110. This alignment is performed such that surface 2124 of target 2100 faces beam control unit 2110 with axis 2122 pointing directly towards beam control unit 2110.

When target 2100 is not aligned with respect to beam control unit 2110 within desired tolerances, area 2116 and area 2118 may rotate relative to surface 2124 of target 2100. This rotation of area 2116 and area 2118 may cause the accuracy of the control of the movement of vehicle 2102 to be less than desired.

In particular, when target 2100 is not aligned with respect to beam control unit 2110 within desired tolerances, the positions of area 2116 and area 2118 on target 2100 may change to indicate that vehicle 2102 has rotated even when vehicle 2102 only translates. In other words, a substantially linear motion of vehicle 102 may cause the relative positions of area 2116 and area 2118 to rotate relative to target 2100. This relative movement of area 2116 and area 2118 may indicate that a rotation has occurred even when the rotation has not occurred.

When only one laser beam is directed at target 2100, the area illuminated on target 2100 may be elongated if target 2100 is not aligned with respect to beam control unit 2110 within desired tolerances. Identifying the center of an area that is elongated may be more difficult than desired.

Figure 22:
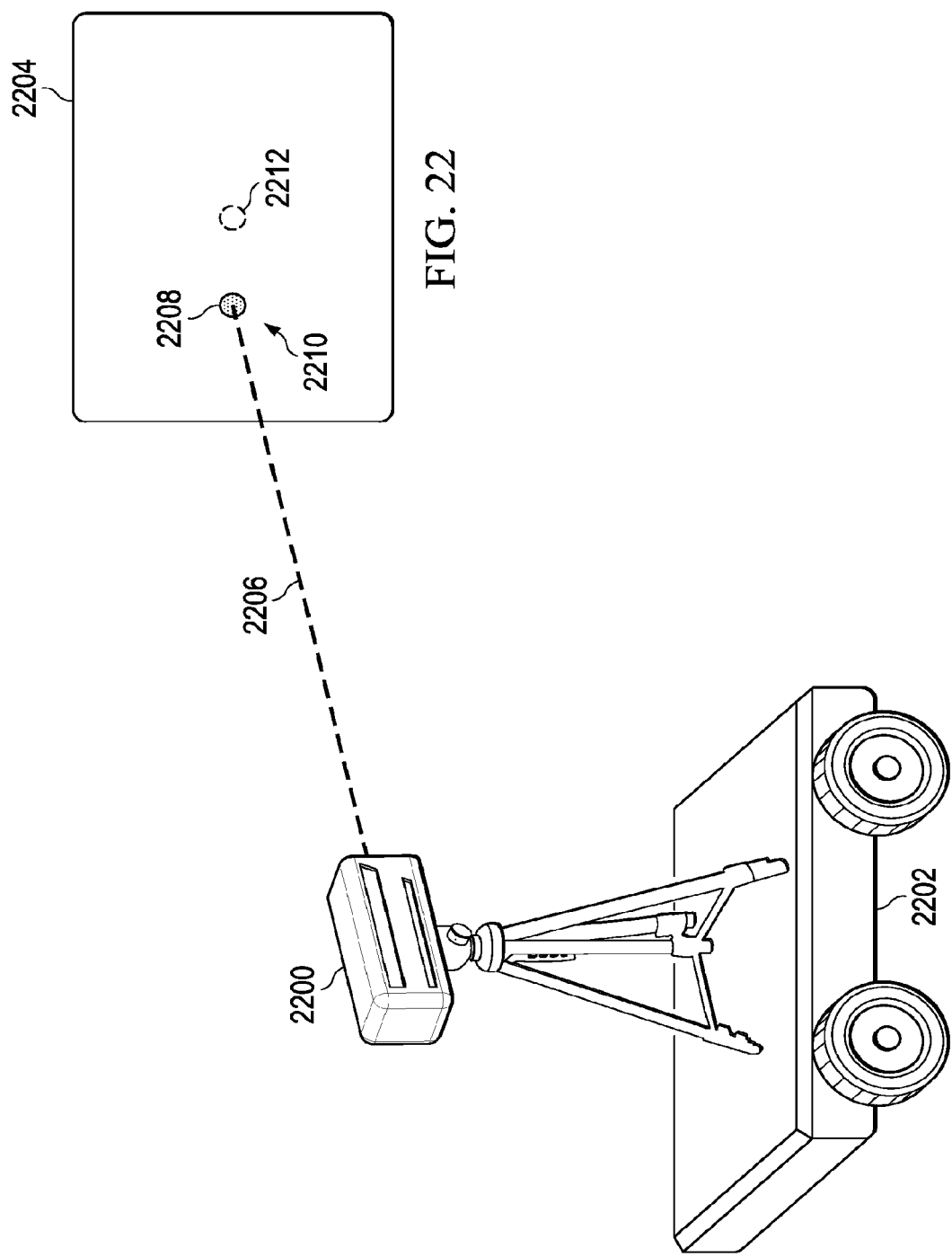
FIG. 22 is an illustration of a beam control unit associated with a vehicle and a stationary target for the vehicle in accordance with an illustrative embodiment.

With reference now to FIG. 22, an illustration of a beam control unit associated with a vehicle and a stationary target for the vehicle is depicted in accordance with an illustrative embodiment. In this illustrative example, beam control unit 2200 is associated with vehicle 2202. Target 2204 for vehicle 2202 is a stationary target and is located remotely to vehicle 2202 in this depicted example.

As illustrated, beam control unit 2200 is configured to generate laser beam 2206 that is directed at target 2204. Laser beam 2206 illuminates area 2208 on target 2204 in this example. A controller for vehicle 2202 may move vehicle 2202 in a manner that reduces the difference between position 2210 for area 2208 on target 2204 and reference position 2212. Beam control unit 2200 may move laser beam 2206 to change position 2210 for area 2208 on target 2204 illuminated by laser beam 2206 to cause vehicle 2202 to move along a desired path.

Figure 23:
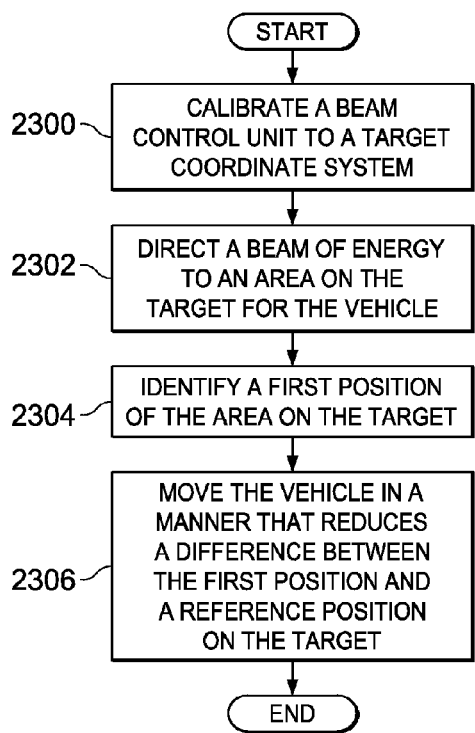
FIG. 23 is an illustration of a flowchart of a process for controlling the movement of a vehicle in accordance with an illustrative embodiment.

With reference now to FIG. 23, an illustration of a flowchart of a process for controlling the movement of a vehicle is depicted in accordance with an illustrative embodiment. The process illustrated in FIG. 23 may be implemented to move vehicle 102 using vehicle control system 106 in FIG. 1.

The process begins by calibrating a beam control unit to a target coordinate system (operation 2300). The beam control unit may include, for example, energy generation system 110 and beam controller 112 in FIG. 1. The target coordinate system is a coordinate system for a target for the vehicle. The target may be, for example, a surface on which the vehicle moves, a structure associated with the vehicle, or some other suitable type of target.

In one illustrative example, when the target is a substantially planar structure, the coordinate system may be a two-dimensional coordinate system. In other words, the surface of the target may be a two-dimensional reference plane.

Thereafter, the process directs a beam of energy to an area on the target for the vehicle (operation 2302). In these illustrative examples, the beam of energy may be a beam of light that illuminates the area on the target. The area may have a shape selected from one of for example, a circle, an ellipse, or some other suitable shape.

The process then identifies a first position of the area on the target (operation 2304). The first position is defined using the target coordinate system. Operation 2304 may be performed using, for example, position system 114 in FIG. 1. The first position of the area may be a centroid of the area in this illustrative example.

Next, the process moves the vehicle in a manner that reduces a difference between the first position and a reference position on the target (operation 2306), with the process terminating thereafter. The reference position is a pre-defined position on the target. The reference position is defined using the target coordinate system for the target. In operation 2306, the difference between the first position and the reference position may be a distance between the first position and the reference position.

Figure 24:
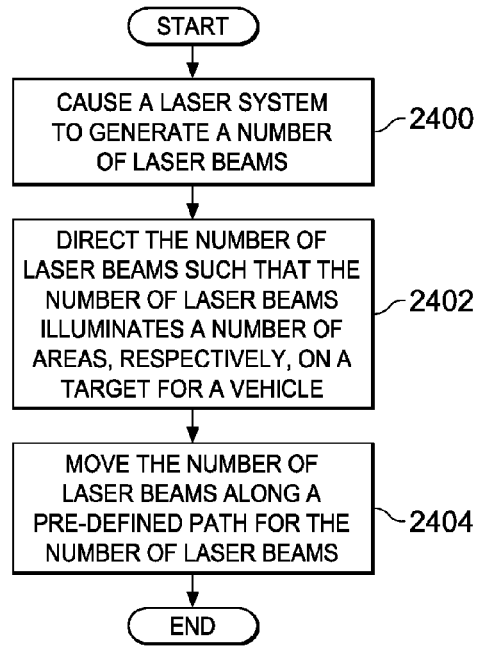
FIG. 24 is an illustration of a flowchart of a process for using beams of light to cause a vehicle to move along a desired path in accordance with an illustrative embodiment.

With reference now to FIG. 24, an illustration of a flowchart of a process for using beams of light to cause a vehicle to move along a desired path is depicted in accordance with an illustrative embodiment. The process illustrated in FIG. 24 may be implemented using vehicle control system 106 to move vehicle 102 along desired path 158 in FIG. 1. In particular, this process may be implemented using beam controller 112 in vehicle control system 106 in FIG. 1.

The process begins by the controller causing a laser system to generate a number of laser beams (operation 2400). The controller then directs the number of laser beams such that the number of laser beams illuminates a number of areas, respectively, on a target for a vehicle (operation 2402). The positions of the number of areas on the target are starting locations for the various areas to be illuminated on the target along a path on the target.

In this illustrative example, the target may be a structure associated with the vehicle. The structure may take the form of, for example, an array of light sensors on a substantially planar platform.

Thereafter, the controller moves the number of laser beams along a pre-defined path for the number of laser beams (operation 2404), with the process terminating thereafter. In operation 2404, the pre-defined path of movement for the number of laser beams is selected to cause the vehicle to move along a desired path in response to the number of laser beams following the pre-defined path.

Further, movement of the number of laser beams causes the number of areas illuminated on the target by the number of laser beams to move with respect to a reference position on the target. In operation 2404, movement of the number of laser beams may include adjusting a number of angles between the number of laser beams, changing a direction in which one or more of the number of laser beams is directed, and/or moving the number of laser beams in some other suitable manner.

Figure 25:
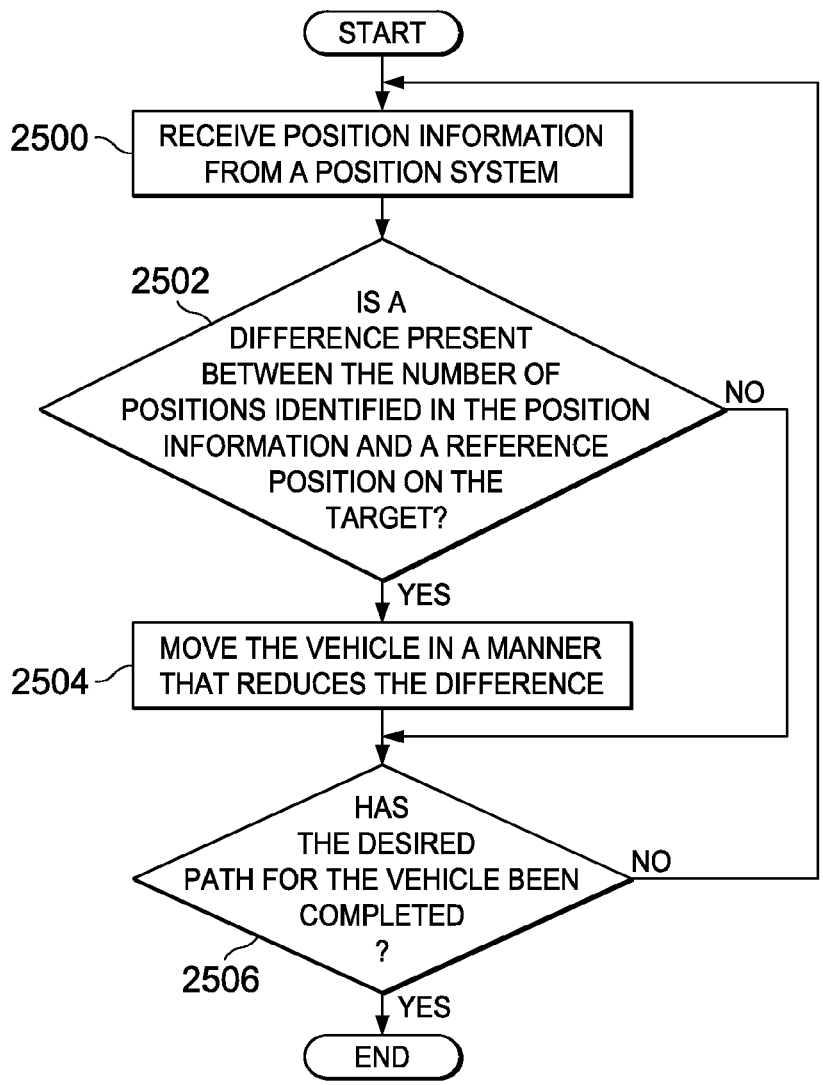
FIG. 25 is an illustration of a flowchart of a process for controlling the movement of a vehicle in accordance with an illustrative embodiment.

With reference now to FIG. 25, an illustration of a flowchart of a process for controlling the movement of a vehicle is depicted in accordance with an illustrative embodiment. The process illustrated in FIG. 25 may be implemented using vehicle control system 106 to move vehicle 102 in FIG. 1. In particular, this process may be implemented using controller 118 in movement system 108 of vehicle control system 106 in FIG. 1.

The process begins by receiving position information from a position system (operation 2500). The position system may include, for example, an array of light sensors and a processor unit. In this illustrative example, the array of light sensors may be held by a substantially planar platform for a target associated with the vehicle. The target may be, for example, target 134 in FIG. 1.

In operation 2500, the processor unit is configured to generate the position information in response to one or more light sensors in the array of light sensors detecting a number of laser beams. The number of laser beams detected may be the number of laser beams generated in operation 2400 and directed onto the target in operation 2402 in FIG. 24. The position information includes a number of positions for a number of areas on the target that are illuminated by the number of laser beams.

The process then determines whether a difference is present between the number of positions identified in the position information and a reference position on the target (operation 2502). As one illustrative example, when one laser beam is directed at the target and illuminates a single area on the target, the difference is a distance between the position for the single area and a reference position that has been pre-defined for the target.

As another illustrative example, when two laser beams are directed at the target and illuminate two areas on the target, the difference between the number of positions and the reference position may include a distance and/or an angle. The distance may be between a centroid of the positions for the two areas on the target illuminated by the two laser beams and the reference position. The angle may be between a reference line through the reference position and a line through the positions of the two areas on the target illuminated by the two laser beams.

If a difference is present, the process moves the vehicle in a manner that reduces the difference (operation 2504). In operation 2504, the movement of the vehicle is along a desired path for the vehicle based on the movement of the number of laser beams on the target.

Thereafter, the process determines whether the desired path for the vehicle has been completed (operation 2506). If the desired path for the vehicle has not been completed, the process returns to operation 2500 as described above. Otherwise, if the desired path has been completed, the process terminates.

With reference again to operation 2502, if a difference is not present, the process proceeds to operation 2506 as described above. In this manner, the process in FIG. 25 describes a closed feedback loop for controlling the movement of the vehicle. As the number of positions for the number of areas illuminated on the target by the number of laser beams changes, the vehicle moves to reduce the difference between the number of positions and the reference position. As a result, movement of the vehicle may be controlled such that the vehicle moves along the desired path with a desired accuracy.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 26, an illustration of a data processing system is depicted in accordance with an illustrative embodiment. In this illustrative example, data processing system 2600 may be used to implement beam controller 112 in FIG. 1 and/or controller 118 in FIG. 1. As depicted, data processing system 2600 includes communications fabric 2602, which provides communications between processor unit 2604, memory 2606, persistent storage 2608, communications unit 2610, input/output (I/O) unit 2612, and display 2614.

Processor unit 2604 serves to execute instructions for software that may be loaded into memory 2606. Processor unit 2604 may be a number of processors, a multi-processor core, or some other type of processor, depending on the particular implementation. A number, as used herein with reference to an item, means one or more items. Further, processor unit 2604 may be implemented using a number of heterogeneous processor systems in which a main processor is present with secondary processors on a single chip. As another illustrative example, processor unit 2604 may be a symmetric multi-processor system containing multiple processors of the same type.

Memory 2606 and persistent storage 2608 are examples of storage devices 2616. A storage device is any piece of hardware that is capable of storing information, such as, for example, without limitation, data, program code in functional form, and/or other suitable information either on a temporary basis and/or a permanent basis. Storage devices 2616 may also be referred to as computer readable storage devices in these examples. Memory 2606, in these examples, may be, for example, a random access memory or any other suitable volatile or non-volatile storage device. Persistent storage 2608 may take various forms, depending on the particular implementation.

For example, persistent storage 2608 may contain one or more components or devices. For example, persistent storage 2608 may be a hard drive, a flash memory, a rewritable optical disk, a rewritable magnetic tape, or some combination of the above. The media used by persistent storage 2608 also may be removable. For example, a removable hard drive may be used for persistent storage 2608.

Communications unit 2610, in these examples, provides for communications with other data processing systems or devices. In these examples, communications unit 2610 is a network interface card. Communications unit 2610 may provide communications through the use of either or both physical and wireless communications links.

Input/output unit 2612 allows for input and output of data with other devices that may be connected to data processing system 2600. For example, input/output unit 2612 may provide a connection for user input through a keyboard, a mouse, and/or some other suitable input device. Further, input/output unit 2612 may send output to a printer. Display 2614 provides a mechanism to display information to a user.

Instructions for the operating system, applications, and/or programs may be located in storage devices 2616, which are in communication with processor unit 2604 through communications fabric 2602. In these illustrative examples, the instructions are in a functional form on persistent storage 2608. These instructions may be loaded into memory 2606 for execution by processor unit 2604. The processes of the different embodiments may be performed by processor unit 2604 using computer-implemented instructions, which may be located in a memory, such as memory 2606.

These instructions are referred to as program code, computer usable program code, or computer readable program code that may be read and executed by a processor in processor unit 2604. The program code in the different embodiments may be embodied on different physical or computer readable storage media, such as memory 2606 or persistent storage 2608.

Program code 2618 is located in a functional form on computer readable media 2620 that is selectively removable and may be loaded onto or transferred to data processing system 2600 for execution by processor unit 2604. Program code 2618 and computer readable media 2620 form computer program product 2622 in these examples. In one example, computer readable media 2620 may be computer readable storage media 2624 or computer readable signal media 2626. Computer readable storage media 2624 may include, for example, an optical or magnetic disk that is inserted or placed into a drive or other device that is part of persistent storage 2608 for transfer onto a storage device, such as a hard drive, that is part of persistent storage 2608.

Computer readable storage media 2624 also may take the form of a persistent storage, such as a hard drive, a thumb drive, or a flash memory, that is connected to data processing system 2600. In some instances, computer readable storage media 2624 may not be removable from data processing system 2600. In these examples, computer readable storage media 2624 is a physical or tangible storage device used to store program code 2618 rather than a medium that propagates or transmits program code 2618. Computer readable storage media 2624 is also referred to as a computer readable tangible storage device or a computer readable physical storage device. In other words, computer readable storage media 2624 is a media that can be touched by a person.

Alternatively, program code 2618 may be transferred to data processing system 2600 using computer readable signal media 2626. Computer readable signal media 2626 may be, for example, a propagated data signal containing program code 2618. For example, computer readable signal media 2626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 2618 may be downloaded over a network to persistent storage 2608 from another device or data processing system through computer readable signal media 2626 for use within data processing system 2600. For instance, program code stored in a computer readable storage medium in a server data processing system may be downloaded over a network from the server to data processing system 2600. The data processing system providing program code 2618 may be a server computer, a client computer, or some other device capable of storing and transmitting program code 2618.

The different components illustrated for data processing system 2600 are not meant to provide architectural limitations to the manner in which different embodiments may be implemented. The different illustrative embodiments may be implemented in a data processing system including components in addition to or in place of those illustrated for data processing system 2600. Other components shown in FIG. 26 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 2604 may take the form of a hardware unit that has circuits that are manufactured or configured for a particular use. This type of hardware may perform operations without needing program code to be loaded into a memory from a storage device to be configured to perform the operations.

For example, when processor unit 2604 takes the form of a hardware unit, processor unit 2604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 2618 may be omitted because the processes for the different embodiments are implemented in a hardware unit.

In still another illustrative example, processor unit 2604 may be implemented using a combination of processors found in computers and hardware units. Processor unit 2604 may have a number of hardware units and a number of processors that are configured to run program code 2618. With this depicted example, some of the processes may be implemented in the number of hardware units, while other processes may be implemented in the number of processors.

In another example, a bus system may be used to implement communications fabric 2602 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 2606, or a cache, such as found in an interface and memory controller hub that may be present in communications fabric 2602.

Thus, the illustrative embodiments provide a method and apparatus for controlling the movement of the vehicle. In one illustrative embodiment, an apparatus comprises an energy source, a position system, and a movement system. The energy source is configured to generate a beam of energy directed at an area on a target for a vehicle. The position system is configured to identify a first position of the area on the target at which the beam of energy is directed. The movement system is configured to move the vehicle in a manner that reduces a difference between the first position of the area on the target at which the beam of energy is directed and a reference position on the target.

In this manner, the different illustrative embodiments provide a system for controlling the movement of a vehicle that does not require sensors and/or a navigation system on-board the vehicle. For example, a vehicle having a structure configured to detect beams of electromagnetic radiation may be used without additional on-board components, such as additional sensors and/or a navigation system. In this manner, the weight and/or cost of the vehicle may be reduced as compared to currently available systems for controlling the movement of a vehicle.

The different illustrative embodiments provide a system that allows both translation and rotation of a vehicle to be simultaneously performed and tracked. Further, the vehicle control system described in the different illustrative embodiments may be used to control the movement of different types of vehicles. Still further, with the vehicle control system described in the different illustrative embodiments, the control of the movement of one vehicle may be transferred from one vehicle control system to another vehicle control system.

Additionally, the vehicle control system described in the different illustrative embodiments does not require the use of radio communications. In this manner, issues with signal disruption and/or interference may be avoided.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A vehicle control system comprising:
   a first energy source configured to generate a first beam of energy directed at a first area on a target for a vehicle;
   a second energy source configured to generate a second beam of energy directed at a second area on the target;
   a position system configured to identify a first position of the first area on the target at which the first beam of energy is directed and a second position of the second area on the target at which the second beam of energy is directed; and
   a movement system configured to simultaneously rotate the vehicle around a vertical axis through the vehicle and translate the vehicle, respectively forming a rotation and a translation, in a combined manner that reduces a difference between the first position of the first area at which the first beam of energy is directed, the second position of the second area at which the second beam of energy is directed, and a reference position on the target, wherein the rotation and the translation are movements independent of each other.

2. The vehicle control system of claim 1, wherein the target is a structure connected to the vehicle, wherein the movement system is configured to move the vehicle with the structure relative to the beam of energy to reduce the difference between the first position of the area at which the beam of energy is directed and the reference position on the target in which the reference position on the structure moves as the vehicle moves and the first position of the beam of energy on the structure moves relative to the reference position on the structure.

3. A method for moving a vehicle, the method comprising:
directing a first beam of energy towards a first area on a target;
directing a second beam of energy towards a second area on the target;
identifying a first position of the first area on the target; and
identifying a second position of the second area on the target; and
simultaneously rotating the vehicle around a vertical axis through the vehicle and translating the vehicle in a combined manner that reduces a difference between the first position of the first area at which the first beam of energy is directed, the second position of the second area at which the second beam of energy is directed, and a reference position on the target, wherein:
the rotating forms a rotation;
the translating forms a translation; and
the rotation and the translation are movements independent of each other.

4. The method of claim 3 further comprising:
moving the beam of energy along a path on the target to cause the vehicle to move along a desired path.

5. The method of claim 4 further comprising:
computing a vector in response to identifying the first position of the area on the target, wherein the vector indicates a distance between the first position and the reference position and a first direction of the first position with respect to the reference position;
moving the vehicle in a second direction that corresponds to the first direction of the vector; and
wherein the vehicle moving along the desired path responsive to the moving of the beam of energy along the path on the target is a robotic crawler, and wherein, responsive to the moving of the beam of energy along the path on the target, the robotic crawler moving along the desired path on a surface of an aircraft and carrying testing equipment configured to perform non-destructive evaluation inspections on the aircraft.

6. The vehicle control system of claim 1, further comprising:
a third energy source configured to generate a third beam of energy directed at a third area on the target for the vehicle, wherein:
the position system is further configured to identify a third position of the third area on the target for the vehicle,
the first beam of energy, the second beam of energy, and the third beam of energy are used for a rotation of the vehicle around a vertical axis through the vehicle,
the first area, the second area, and the third area have a non-collinear arrangement, and
the third beam of energy is configured to allow additional rotational degrees of freedom to be measured relative to rotational degrees of freedom the first beam of energy and the second beam of energy are configured to allow to be measured.

7. The vehicle control system of claim 1, wherein the difference between the first position, the second position, and the reference position comprises at least one of a distance between the reference position and a centroid of the first position and the second position and an angle between a line through the first position and the second position and a reference line through the reference position.

8. The vehicle control system of claim 1, wherein the energy source is a light source and the beam of energy is a beam of light that illuminates the area on the target.

9. The vehicle control system of claim 8, wherein the position system comprises:
a camera system configured to generate images of the target with the area illuminated by the beam of light; and
a processor unit configured to identify the first position of the area illuminated by the beam of light on the target.

10. The vehicle control system of claim 8, wherein the position system comprises:
an array of light sensors on the target; and
a processor unit configured to identify the first position of the area illuminated by the beam of energy on the target from a number of light sensors in the array of light sensors on the target detecting the beam of energy.

11. The vehicle control system of claim 1, wherein:
a beam control unit comprises the first energy source and the second energy source;
the first beam of energy is a first laser beam;
the second beam of energy is a second laser beam; and
the movement system is configured to move the vehicle in a first direction when the beam control unit widens an angle between the first laser beam and the second laser beam.

12. The vehicle control system of claim 1, wherein the target is selected from one of a piece of frosted glass, an array of sensors, an array of photosensitive elements, an array of photodiodes, an array of phototransistors, a substantially planar structure, a diffusion filter, and an opaque surface.

13. The vehicle control system of claim 11, wherein:
the movement system is configured to move the vehicle in a second direction when the beam control unit narrows the angle between the first laser beam and the second laser beam; and
the second direction is opposite from the first direction.

14. The vehicle control system of claim 1, wherein the beam of energy is selected from one of a beam of ultraviolet light and a beam of microwave radiation.

15. The vehicle control system of claim 1, wherein the vehicle is a robotic vehicle and wherein the robotic vehicle comprises a holonomic drive system.

* * * * *